US011333255B2

(12) United States Patent
Enke et al.

(10) Patent No.: US 11,333,255 B2
(45) Date of Patent: May 17, 2022

(54) VALVE ASSEMBLY

(71) Applicant: Tenneco Automotive Operating Company Inc., Lake Forest, IL (US)

(72) Inventors: Olaf Enke, Ann Arbor, MI (US); Brian A. Kunkel, Grass Lake, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 16/445,964

(22) Filed: Jun. 19, 2019

(65) Prior Publication Data

US 2020/0182358 A1  Jun. 11, 2020

Related U.S. Application Data

(63) Continuation-in-part of application No. 16/213,310, filed on Dec. 7, 2018, now Pat. No. 11,041,459.

(51) Int. Cl.
*F16K 1/20* (2006.01)

(52) U.S. Cl.
CPC .......... *F16K 1/2014* (2013.01); *F16K 1/2028* (2013.01)

(58) Field of Classification Search
CPC ...... F16K 1/2014; F16K 1/2028; F16K 1/205; F16K 1/2078; F16K 11/052; F16K 27/0227; F16K 27/0209; F01N 2240/36; F01N 1/18; F01N 13/087; F01N 13/10; F01N 2240/02; F01N 3/0205; F01L 7/16; F01L 7/18
USPC .................. 137/875; 251/305–308, 301, 302
See application file for complete search history.

(56) References Cited

U.S. PATENT DOCUMENTS

| 260,490 | A | * | 7/1882 | Martin et al. ......... F16K 11/052 |
| | | | | 137/875 |
| 2,546,114 | A | | 3/1951 | Triplett et al. |
| 3,262,671 | A | * | 7/1966 | Muench .................... F16K 1/24 |
| | | | | 251/163 |
| 3,506,239 | A | | 4/1970 | Johnson |
| 4,406,441 | A | * | 9/1983 | Lukesch .............. F16J 15/3208 |
| | | | | 251/214 |
| 4,972,577 | A | | 11/1990 | Dierikx |

(Continued)

FOREIGN PATENT DOCUMENTS

| DE | 7916836 | 3/1980 |
| DE | 102011008621 | 5/2012 |

(Continued)

OTHER PUBLICATIONS

PCT International Search Report and the Written Opinion of the International Searching Authority for Counterpart PCT/US2020/038106, 13 Pages, dated Sep. 25, 2020.

*Primary Examiner* — Craig J Price
*Assistant Examiner* — Andrew J Rost
(74) *Attorney, Agent, or Firm* — McGarry Bair PC

(57) ABSTRACT

A valve assembly includes a valve body. The valve body includes a valve seat. The valve seat defines a bore therethrough. The valve body also includes a pair of end members connected to the valve body at opposing sides of the valve body. Each of the pair of end members includes a trunnion. The valve assembly further includes a valve shaft received in the trunnion of each of the pair of end members. The valve assembly includes a valve plate connected to the valve shaft. The valve plate is rotatable between a first position and a second position. The valve plate is adjacent to the valve seat when the valve assembly is in the first position.

22 Claims, 14 Drawing Sheets

(56) References Cited

U.S. PATENT DOCUMENTS

| | | | | |
|---|---|---|---|---|
| 5,908,047 A * | 6/1999 | Nakamura | | F01N 3/027 |
| | | | | 137/875 |
| 6,648,018 B2 * | 11/2003 | Gagnon | | F16K 11/052 |
| | | | | 137/875 |
| 6,901,942 B2 * | 6/2005 | Krimmer | | B29C 45/0055 |
| | | | | 137/15.25 |
| 8,152,137 B2 * | 4/2012 | Comin | | F04D 27/0215 |
| | | | | 251/301 |
| 8,191,572 B2 | 6/2012 | Lefler et al. | | |
| 8,439,073 B2 * | 5/2013 | Marocchini | | F16K 11/052 |
| | | | | 137/625.4 |
| 8,469,336 B2 * | 6/2013 | Nakamura | | F02D 9/106 |
| | | | | 251/214 |
| 8,657,065 B1 | 2/2014 | Hill | | |
| 9,540,995 B2 | 1/2017 | Houtschilt et al. | | |
| 9,982,793 B2 | 5/2018 | Thomas et al. | | |
| 9,982,794 B2 | 5/2018 | Thomas | | |
| 10,041,389 B2 | 8/2018 | Weidner et al. | | |
| 2006/0283513 A1 * | 12/2006 | Kurian | | F16K 1/2028 |
| | | | | 137/875 |
| 2007/0080314 A1 * | 4/2007 | Abram | | F01N 1/18 |
| | | | | 251/305 |
| 2016/0032794 A1 | 2/2016 | Fischer et al. | | |
| 2016/0258484 A1 | 9/2016 | Korn | | |
| 2017/0204756 A1 | 7/2017 | Middleton, Jr. et al. | | |
| 2018/0003097 A1 | 1/2018 | Godard et al. | | |
| 2018/0051607 A1 | 2/2018 | Geer et al. | | |
| 2018/0051610 A1 | 2/2018 | Thomas et al. | | |
| 2018/0171940 A1 | 6/2018 | Gonzalez et al. | | |
| 2020/0182358 A1 | 6/2020 | Enke et al. | | |

FOREIGN PATENT DOCUMENTS

| | | |
|---|---|---|
| EP | 2336511 | 8/2013 |
| EP | 3252285 A1 | 12/2017 |
| EP | 2748497 | 10/2018 |
| JP | 2004251250 | 9/2004 |
| KR | 101708777 B1 | 2/2017 |
| WO | 2015072271 | 5/2015 |

* cited by examiner

VALVE ASSEMBLY

CROSS-REFERENCE TO RELATED APPLICATIONS

This application is a Continuation-in-part and claims the benefit of U.S. patent application Ser. No. 16/213,310, filed Dec. 7, 2018, the contents of which are hereby incorporated by reference.

TECHNICAL FIELD

The present disclosure relates to valve assemblies.

BACKGROUND

Valve assemblies are used in many types of application, such as in an exhaust gas heat recovery system, passive valve systems, and electronic valve systems. A valve body of the valve assembly typically provides a sealing surface and design features to accommodate another moving component and/or assembly, such as a valve plate, that operates between an open position and a closed position. The valve plate opens to allow fluid flow through a defined opening and closes to block or prevent fluid flow through the defined opening depending on desired operating conditions. Such valve bodies include a complex geometry for sealing against a housing, such as an exhaust pipe, to avoid any undesired fluid leakage. Based on a design complexity of the housing, the valve body typically includes a cast component to form complex contours, which increases an overall cost and weight of the valve assembly.

Further, the valve assembly typically includes a wire mesh gasket to minimize leakage around the valve assembly and avoid machining cost. Wire mesh gaskets on valve plates are generally held together by a holding plate that is located on the wire mesh gasket and then riveted together with the valve plate. The use of rivets may increase a cost of the valve assembly. Attaching the wire mesh gasket to the valve plate may also be difficult.

SUMMARY

In an aspect of the present disclosure, a valve assembly is provided. The valve assembly includes a valve body. The valve body includes a valve seat. The valve seat defines a bore therethrough. The valve body is positioned in an exhaust passageway. The valve body also includes a pair of end members connected to the valve body at opposing sides of the valve body. Each of the pair of end members includes a trunnion. Each of the trunnions protrudes through a corresponding opening provided in the exhaust passageway. The valve assembly further includes a valve shaft received in the trunnion of each of the pair of end members. The valve assembly includes a valve plate connected to the valve shaft. The valve plate is rotatable between a first position and a second position. The valve plate is adjacent to the valve seat when the valve assembly is in the first position.

In another aspect of the present disclosure, a valve assembly is provided. The valve assembly includes a valve body. The valve body includes a valve seat. The valve seat defines a bore therethrough. The valve body is positioned in an exhaust passageway. The valve body also includes a bearing member connected to the valve body. The bearing member includes a pair of trunnions at opposing sides of the bearing member. Each of the trunnions protrudes through a corresponding opening provided in the exhaust passageway. The valve assembly further includes a valve shaft received in the pair of trunnions. The valve assembly includes a valve plate connected to the valve shaft. The valve plate is rotatable between a first position and a second position. The valve plate is adjacent to the valve seat when the valve assembly is in the first position.

Other features and aspects of this disclosure will be apparent from the following description and the accompanying drawings.

DETAILED DESCRIPTION

Wherever possible, the same reference numbers will be used throughout the drawings to refer to same or like parts.

Figure 1:
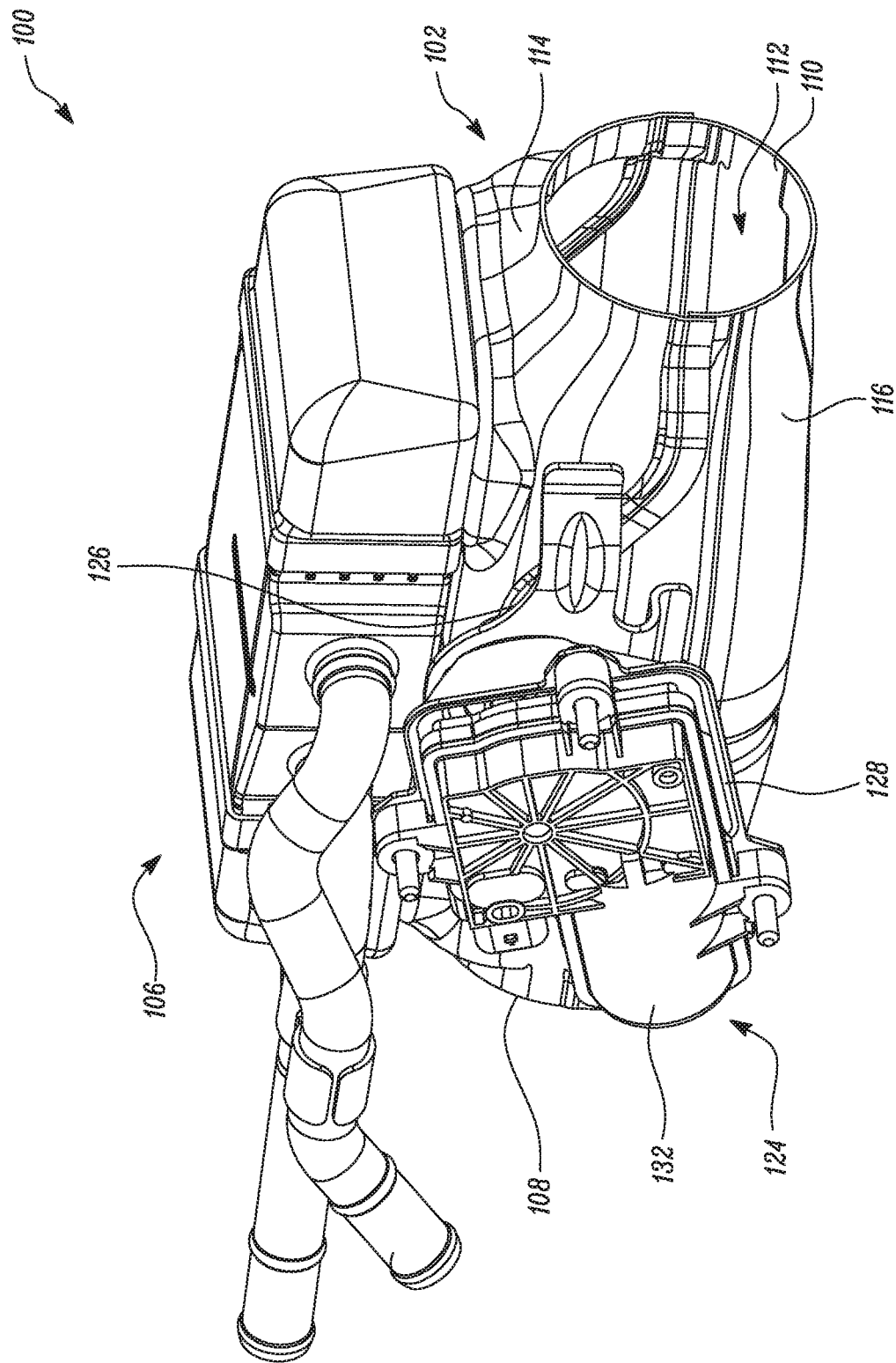
FIG. 1 is a perspective view of an exhaust gas heat recovery (EGHR) system, according to an aspect of the present disclosure.

As shown in FIG. 1, an exhaust gas heat recovery system 100 (hereinafter referred to as "EGHR system 100") associated with an engine (not shown) is provided. The EGHR system 100 may be disposed in an exhaust gas flow path of an engine exhaust system (not shown) at any suitable location between a cylinder head (not shown) and a tailpipe (not shown) of the engine through which fluid, such as exhaust gas, is discharged into ambient air. In some configurations, the EGHR system 100 may be in direct or indirect fluid communication with a catalytic converter, a NOx trap, an exhaust manifold, a turbocharger, or any other exhaust system component. In some configurations, an exhaust gas recirculation (EGR) device (not shown) may be disposed between the engine and the EGHR system 100. In such configurations, the EGHR system 100 may receive substantially all of the exhaust gas that is not recirculated from the EGR device back to an engine intake charge air system (not shown) and/or an intake air pipe (not shown).

With reference to FIG. 1, the EGHR system 100 includes a housing assembly 102, a valve assembly 104 (see FIG. 2), a heat exchanger assembly 106, and an actuator assembly 124. The housing assembly 102 defines an inlet 108, an outlet 110, and a bypass or first fluid passageway 112. The first fluid passageway 112 may be hereinafter interchangeably referred to as an exhaust passageway 112. The first fluid passageway 112 may extend in a longitudinal direction of the housing assembly 102 and between the inlet 108 and the outlet 110. The housing assembly 102 may also cooperate with the heat exchanger assembly 106 to define a second fluid passageway (not shown) extending between the inlet 108 and the outlet 110. The housing assembly 102 includes a first or upper shell 114 and a second or lower shell 116. The first shell 114 may have a generally semi-circular or "U" cross-sectional shape and defines a heat exchanger inlet 134 (shown in FIG. 2) and a heat exchanger outlet 136 (shown in FIG. 2). The second shell 116 may also have a generally semi-circular or "U" cross-sectional shape and is attached to the first shell 114 such that the first and second shells 114, 116 cooperate to define the inlet 108, the outlet 110, and the first fluid passageway 112.

The heat exchanger assembly 106 may include one or more plates or tubes, and a working fluid (e.g., engine coolant, engine oil, or transmission fluid) that is circulated therethrough in order to exchange heat with the exhaust gases. Further, heat recovered by the working fluid may be used for rapid warm-up of engine coolant to aid in faster windshield defrosting, improved HVAC (heating, ventilation and air condition) system performance, and/or to improve fuel economy by reducing viscous losses through heating of various fluid systems in the vehicle, such as engine oil and transmission fluid, for example.

Figure 2:
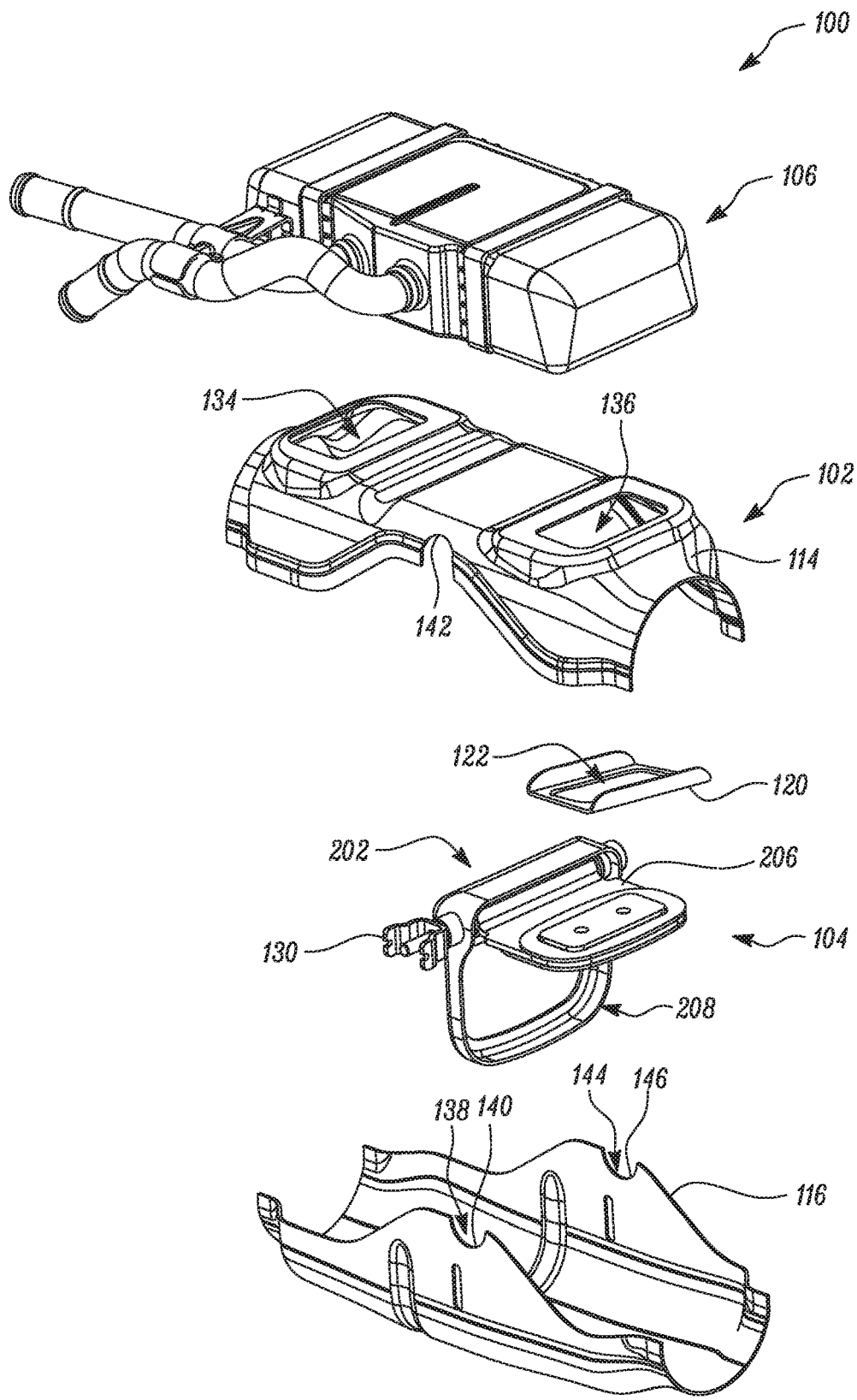
FIG. 2 is an exploded perspective view of the EGHR system illustrating a valve assembly in a second position.

Referring to FIG. 2, the valve assembly 104 is disposed within the housing assembly 102. The valve assembly 104 includes a monolithic valve body or housing 202, a valve shaft 204 (shown in FIG. 4), and a valve plate 206. In the illustrated embodiment, the valve body 202 is integrally formed by at least one of stamping and deep drawing. The valve body 202 is positioned in the exhaust passageway 112. The valve body 202 may be symmetrical about a plane dividing the first fluid passageway 112 (see FIG. 1) in half. An outer geometry of the valve body 202 may be contoured to correspond to inner walls of the first shell 114 to restrict exhaust gases from passing between a valve seat 208 of the valve body 202 and the housing assembly 102 and out of the EGHR system 100.

Figure 3:
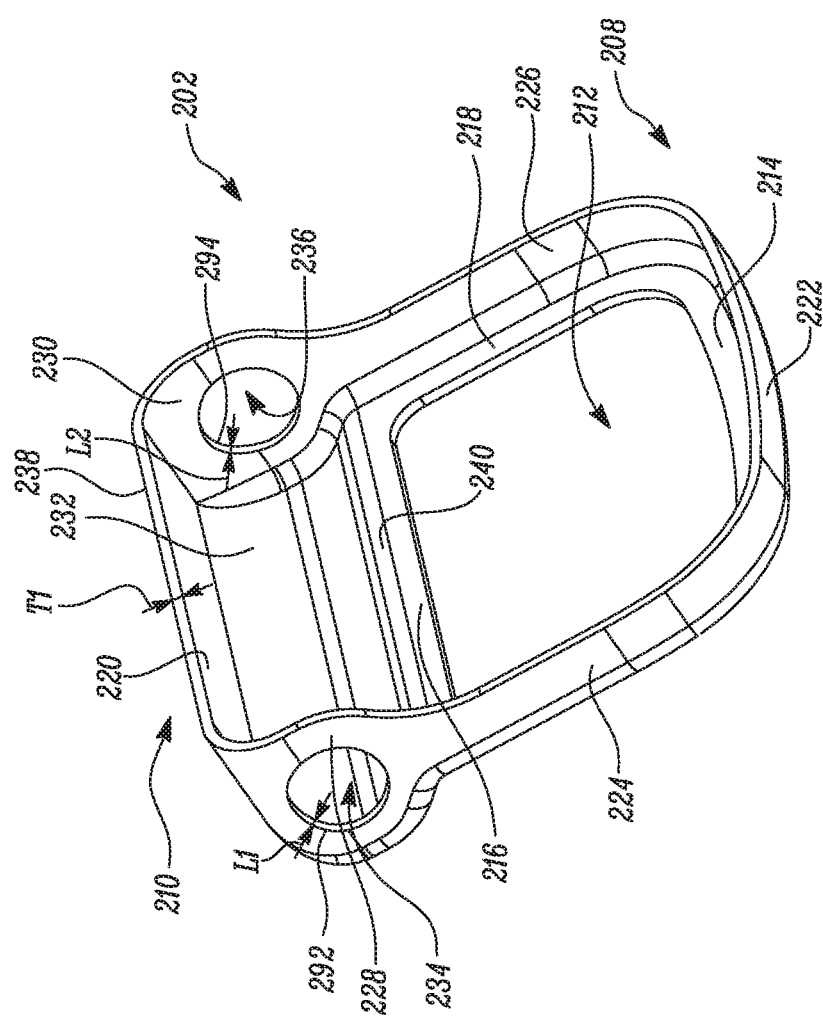
FIG. 3 is a perspective view of a valve body associated with the valve assembly of FIG. 2, according to an aspect of the present disclosure.

As illustrated in FIG. 3, the valve body 202 includes the valve seat 208 and a connecting portion 210. The valve seat 208 is substantially rectangular in shape with rounded edges. The valve seat 208 defines a bore 212 therethrough. The valve seat 208 includes a bottom wall 214, a top wall 216, and a pair of side walls 218 (one of which is illustrated herein) that define the bore 212. The rectangular-shaped bore 212 may increase a flow rate of fluid flowing through the first fluid passageway 112 (see FIG. 1) compared to a circular opening, for example. Further, the valve seat 208 includes a bottom flange 222 extending from the bottom wall 214, a first side flange 224 extending from the side wall 218, and a second side flange 226 extending from the side wall 218. Each of the bottom, first side, and second side flanges 222, 224, 226 extend along a same direction. Further, each of the bottom, first side, and second side flanges 222, 224, 226 may extend along a direction that is substantially perpendicular to a plane defined by the bore 212.

In some configurations, the bottom flange 222 and a bottom portion of the second shell 116 may be attached (e.g., welded) to each other. Further, the top wall 216 and the connecting portion 210 are integrally formed. The side flanges 224, 226 and sides of the second shell 116 may be attached (e.g., welded) to each other. In this way, any gaps between the valve seat 208 and the housing assembly 102 (see FIGS. 1 and 2) are removed, which reduces internal leaks (i.e., fluid flowing through gaps between the valve seat 208 and the housing assembly 102 and not through the heat exchanger assembly 106) of the EGHR system 100.

Further, the connecting portion 210 is integral with and extends from the valve seat 208. The connecting portion 210 includes a first wall 228, a second wall 230, a top flange 220, and a curved portion 232. The first and second walls 228, 230 may be disposed opposite to each other. The first and second walls 228, 230 extend in a direction that is same as the direction along which each of the top flange 220 and the bottom, first side, and second side flanges 222, 224, 226 of the valve seat 208 extend. Specifically, the first and second walls 228, 230 and the top flange 220 may extend along a direction that is substantially perpendicular to a plane defined by the bore 212. The first and second walls 228, 230 are further integral with the first and second side flanges 224, 226, respectively.

The connecting portion 210 further includes a pair of surfaces 292, 294 defining a pair of through apertures 234, 236 disposed at opposing sides of the connecting portion 210. More particularly, the connecting portion 210 includes a first through aperture 234 provided within the first wall 228 and a second through aperture 236 provided within the second wall 230. The surface 292 of the first wall 228 defines the first through aperture 234. The surface 294 of the second wall 230 defines the second through aperture 236. Each of the surfaces 292, 294 may be substantially planar. Further, each of the surfaces 292, 294 may have a circular cross-section. Consequently, each of the pair of through apertures 234, 236 may be substantially circular. However, cross-sectional shapes of the surfaces 292, 294 and hence the through apertures 234, 236 may be varied as per application requirements, and may be elliptical, oval, polygonal, and so forth. The pair of through apertures 234, 236 are axially aligned with each other. Further, a diameter of the first through aperture 234 may be substantially equal to a diameter of the second through aperture 236.

A length "L1", "L2" of each of the pair of surfaces 292, 294 may be approximately equal to a thickness "T1" of the connecting portion 210. In other words, the length "L1" of the surface 292 defining the through aperture 234 may be approximately equal to the thickness "T1" of the connecting portion 210. Further, the length "L2" of the surface 294 defining the through aperture 236 may be approximately equal to the thickness "T1" of the connecting portion 210. It should be noted that the lengths "L1", "L2" of the respective surfaces 292, 294 extend along an axis that is generally parallel to an axis "A-A1" defined by the valve shaft 204. In other words, the lengths "L1", "L2" may be measured along axes of the corresponding through apertures 234, 236. In other examples, the length "L1" may be different from the length "L2" due to manufacturing variations. Further, one or more of the lengths "L1", "L2" may be greater than the thickness "T1" due to manufacturing.

An upper edge 238 defined by the top flange 220 of the connecting portion 210 is connected to the first shell 114 whereas a lower edge 240 defined by the curved portion 232 of the connecting portion 210 is integral with the valve seat 208. The connecting portion 210 may be connected to the first shell 114 by welding. Further, the connecting portion 210 defines lands 242 (shown in FIG. 5) on an outer surface of the respective first and second walls 228, 230 and surrounding the first and second through apertures 234, 236, respectively. The first and second shells 114, 116 are connected to the connecting portion 210 at each land 242. The connecting portion 210 may be welded to the first and second shells 114, 116 at each land 242.

Figure 4:
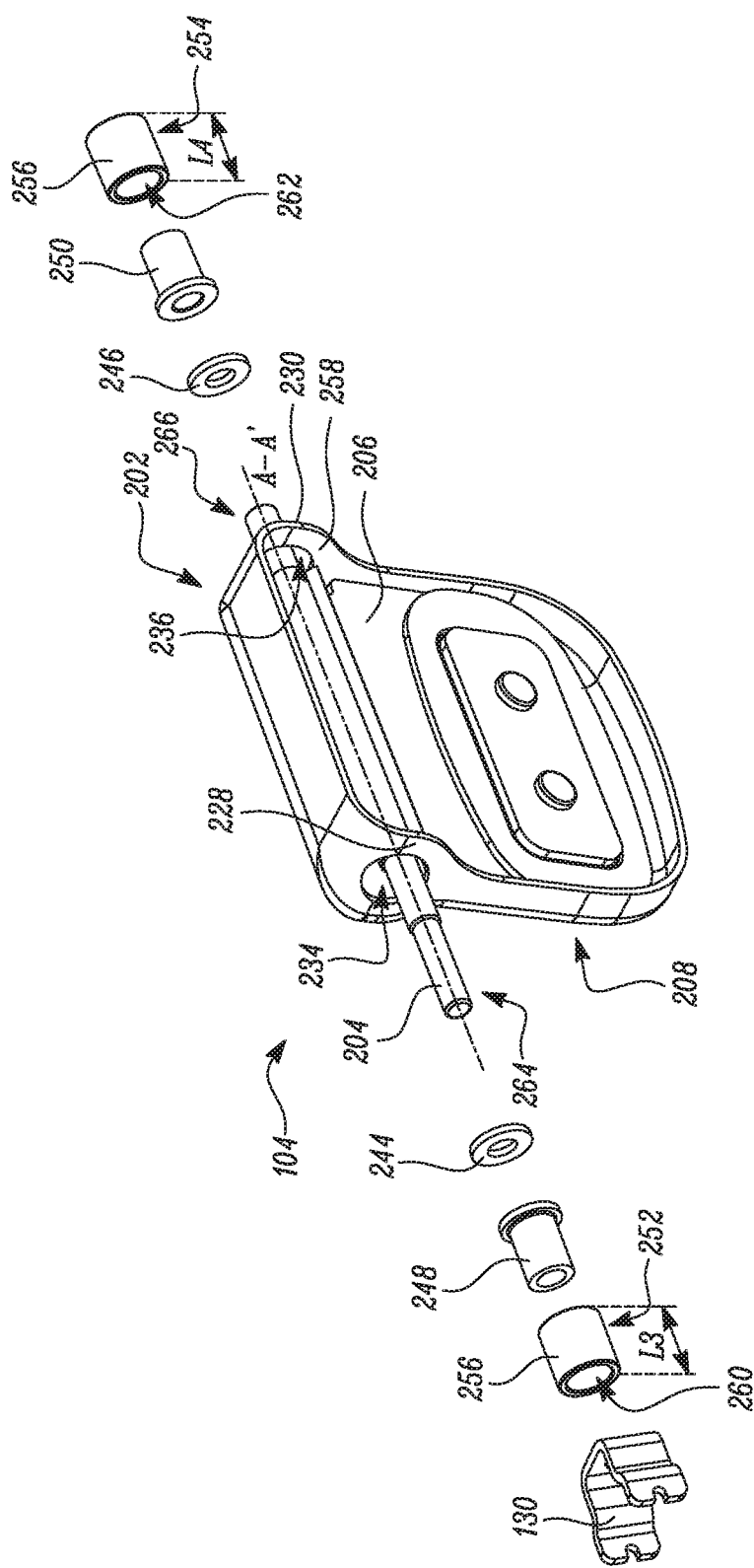
FIG. 4 is a perspective view of a valve assembly associated with the EGHR system of FIG. 1 illustrating the valve assembly in a first position, according to an aspect of the present disclosure.

Referring now to FIG. 4, the valve shaft 204 is received through the pair of through apertures 234, 236. In the illustrated example, the valve shaft 204 is rotatably received through the pair of through apertures 234, 236 such that the valve shaft 204 is rotatable about the connecting portion 210. The valve shaft 204 may extend transversely (i.e., perpendicular relative to the longitudinal direction of the housing assembly 102) with respect to the first fluid passageway 112 and is rotatable about the axis "A-A1". Alternatively, the valve shaft 204 may be fixedly connected to the connecting portion 210. The valve shaft 204 and the pair of through apertures 234, 236 may be coaxially aligned. The valve shaft 204 includes a central portion 296 and a pair of side portions 298, 300 disposed at either ends 264, 266 of the valve shaft 204. The central portion 296 has a diameter that is greater than a diameter of each of the side portions 298, 300 of the valve shaft 204. Further, the curved portion 232 of the connecting portion 210 partially encloses the valve shaft 204, when the valve shaft 204 is coupled with the valve body 202.

The valve assembly 104 includes a pair of washers 244, 246 and a pair of bushings 248, 250. The pair of washers 244, 246 are embodied as rings that may be manufactured by a stamping process. Each of the pair of washers 244, 246 receive the valve shaft 204 therethrough and are disposed adjacent to a corresponding bushing 248, 250 of the pair of bushings 248, 250. More particularly, the first washer 244 of the valve assembly 104 is disposed adjacent to the first bushing 248, whereas the second washer 246 is disposed adjacent to the second bushing 250. The first washer 244 and the first bushing 248 may sealingly engage with the first wall 228 whereas the second washer 246 and the second bushing 250 may sealingly engage with the second wall 230.

In an assembled condition of the valve assembly 104, the first and second washers 244, 246 are held in position by the central portion 296 of the valve shaft 204. More particularly, the first washer 244 is disposed between the central portion 296 of the valve shaft 204 and the first bushing 248 proximal to an end 264 of the valve shaft 204 to prevent the first bushing 248 and the first washer 244 from moving axially along the valve shaft 204. Further, the second washer 246 is disposed between the central portion 296 of the valve shaft 204 and the second bushing 250 proximal to an end 266 of the valve shaft 204 to prevent the second bushing 250 and the second washer 246 from moving axially along the valve shaft 204. In an alternate embodiment, when the valve assembly 104 is in the assembled condition, the first and second washers 244, 246 may be held in position by the valve plate 206 to prevent the respective bushings 248, 250 from moving axially along the valve shaft 204. The washers 244, 246 may also reduce external leaks (i.e., fluid flowing out of the EGHR system 100) of the EGHR system 100.

Further, the first and second bushings 248, 250 may be embodied as wire-mesh bushings that may be disposed to rotatably support the valve shaft 204. The valve shaft 204 is at least partially received within the pair of bushings 248, 250. Each of the bushings 248, 250 may include a substantially hollow cylindrical shape with a flange at one end. The flange may interface with the corresponding washer 244 or 246. The valve assembly 104 includes a pair of sleeves 252, 254 connected to the connecting portion 210 of the valve body 202. Each of the pair of sleeves 252, 254 may be made of tube steel. Each of the pair of sleeves 252, 254 are received through the corresponding through aperture 234, 236 of the pair of through apertures 234, 236. Each of the sleeves 252, 254 may have a substantially hollow cylindrical shape. It should be noted that the valve shaft 204, the washers 244, 246, and the sleeves 252, 254 may be manufactured easily at a lower cost by cutting sections off corresponding elongate profiles.

On insertion of the valve shaft 204, an outer surface 256 of the respective sleeve 252, 254 and an inner side 258 of the respective first and second walls 228, 230 around the through apertures 234, 236 define welding surfaces "W1" (see FIG. 5) to keep the valve shaft 204, the bushings 248, 250, and the washers 244, 246 in position. Thus, the sleeves 252, 254 are connected to the inner side 258 of the corresponding first and second walls 228, 230 by welding thereby eliminating any undesirable movement of the valve shaft 204, the bushings 248, 250, and the washers 244, 246. A length "L3", "L4" of each of the pair of sleeves 252, 254 is greater than the length "L1", "L2" (see FIG. 3) of each of the pair of surfaces 292, 294 (see FIG. 3). Specifically, the length "L3" of the sleeve 252 is greater than the length "L1" of the surface 292, whereas the length "L3" of the sleeve 254 is greater than the length "L2" of the surface 294. Further, each of the first and second sleeves 252, 254 define a through-opening 260, 262, respectively. Each of the pair of bushings 248, 250 are received at least partially within the corresponding sleeve 252, 254 of the pair of sleeves 252, 254. More particularly, the pair of bushings 248, 250 are partially received within the through-openings 260, 262 of the corresponding sleeve 252, 254 of the pair of sleeves 252, 254.

A cap (not shown) may be disposed adjacent to any one of the ends 264, 266 of the valve shaft 204. The cap may be sealingly engaged with one of the through apertures 234, 236 of the connecting portion 210 such that fluid flowing through the first fluid passageway 112 does not leak out of the EGHR system 100. In some configurations, the cap may be disposed outside of one of the through apertures 234, 236 and may be pressed onto respective end 264, 266 of the valve shaft 204. In such configurations, the cap may cover one of the through apertures 234, 236 such that fluid flowing through the first fluid passageway 112 does not leak out of the EGHR system 100. The actuator assembly 124 (shown in FIG. 1) may be attached to one of the ends 264, 266 of the valve shaft 204 which is not sealed by the cap. In the illustrated example, the cap is disposed at the end 266 and the actuator assembly 124 is attached at the end 264.

Further, the valve plate 206 is connected to the valve shaft 204. The valve plate 206 may be manufactured by stamping or deep drawing and may be embodied as a flapper plate. In the illustrated example, the valve plate 206 is disposed within the housing assembly 102 and is fixed for rotation with the valve shaft 204. Alternatively, the valve plate 206 may rotate with respect to the valve shaft 204. In such an example, the valve plate 206 may include a rotatable collar assembly (not shown) that rotates on the valve shaft 204 to allow rotation of the valve plate 206. The valve plate 206 is rotatable between a first position (shown in FIG. 4) and a second position (shown in FIG. 2). The valve plate 206 is adjacent to a second valve seat 120 (shown in FIG. 2) when the valve assembly 104 is in the second position. The second valve seat 120 may be hereinafter interchangeably referred to as a baffle 120. The valve plate 206 is adjacent to the valve seat 208 when the valve assembly 104 is in the first position. More particularly, the valve plate 206 may be in a sealing engagement with the valve seat 208. A gasket (not shown) may be disposed between the valve plate 206 and the valve seat 208 to sealingly engage the valve plate 206 with the valve seat 208. The gasket may be disposed on the valve plate 206 or the valve seat 208. Further, at the first position, the valve plate 206 allows fluid flow through the second fluid passageway and prevents fluid flow through the first fluid passageway 112.

In the second position, the valve plate 206 is adjacent to a baffle 120 (see FIG. 2). The baffle 120 will be explained later in this section. More particularly, the valve plate 206 may be in a sealing engagement with the baffle 120. A gasket (not shown) may be disposed between the valve plate 206 and the baffle 120 to sealingly engage the valve plate 206 with the baffle 120. The gasket may be disposed on the valve plate 206 or the baffle 120. An angle of rotation of the valve plate 206 between the first and second positions may be between 45 degrees and 120 degrees, for example. The valve plate 206 may be rotatable about the axis "A-A1" of the valve shaft 204 between the second position whereat fluid flows through the first fluid passageway 112 and the first position whereat fluid is prevented from flowing through the first fluid passageway 112 (see FIG. 1). In some configurations, the valve plate 206 may be movable to a third or intermediate position (i.e., a position between the first and second positions). In such configurations, the valve plate 206 may control fluid flow through both the first fluid passageway 112 and the second fluid passageway.

Figure 5:
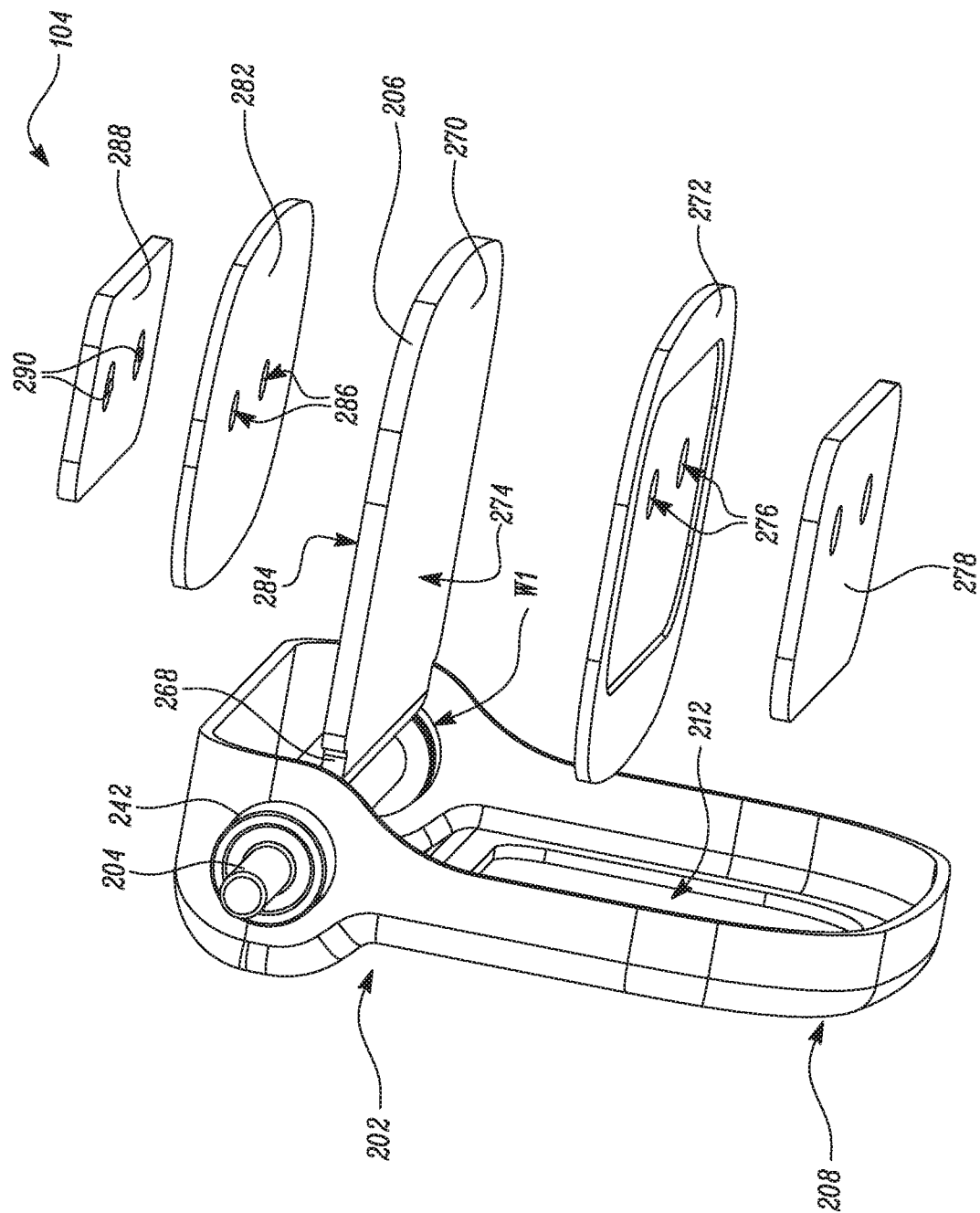
FIG. 5 is an exploded view of a valve plate assembly associated with the valve assembly of FIG. 2.

As shown in FIG. 5, the valve plate 206 includes a curved first portion 268 and a generally rectangular-shaped and planar second portion 270 extending from the first portion 268. The first portion 268 is attached (e.g., welded) to the valve shaft 204 so that the valve plate can rotate with the valve shaft 204. A first pad 272 is disposed on a first surface 274 of the valve plate 206. When the valve plate 206 is in the first position, the first pad 272 is sealingly engaged with the valve seat 208 along a periphery of the bore 212 such that fluid is not allowed to flow through the first fluid passageway 112 (see FIG. 1). The first pad 272 may be made of a wire-mesh material or any other suitable material that reduces noise as the first pad 272 is sealingly engaged with the valve seat 208 along the periphery of the bore 212. The first pad 272 may have a surface area that is smaller than a surface area of the second portion 270. The first pad 272 defines at least one first aperture 276. In the illustrated example, the first pad 272 defines a pair of first apertures 276. The first apertures 276 are through apertures. The first pad 272 may have a substantially planar configuration.

Figure 6:
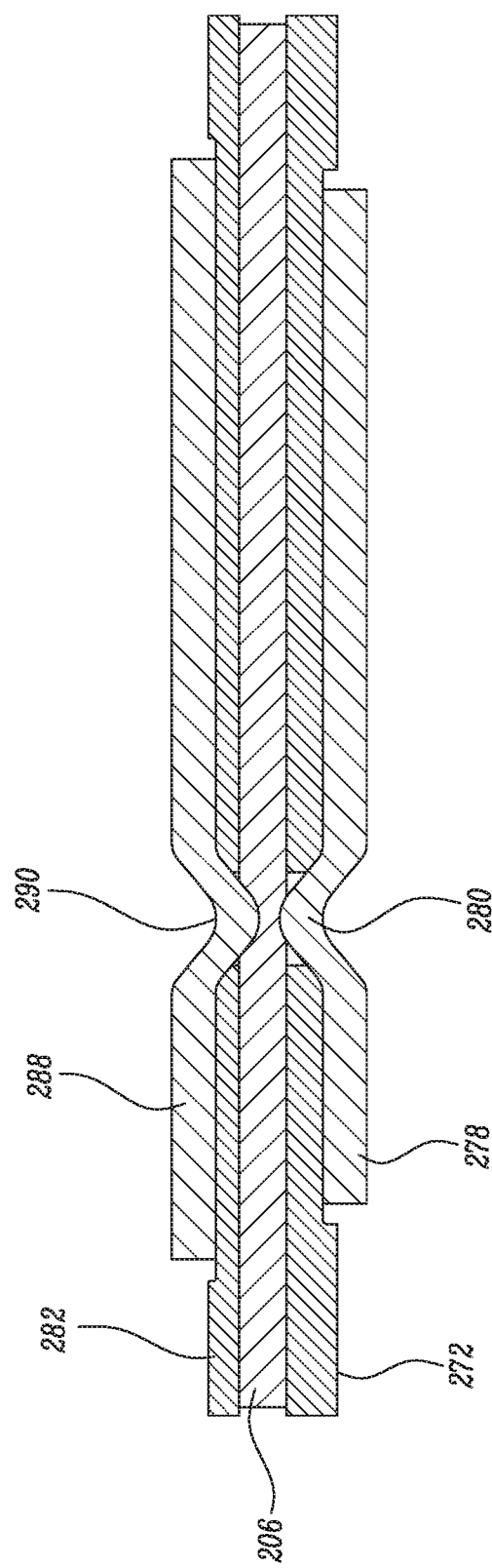
FIG. 6 is a sectional view of the valve plate assembly shown in FIG. 5.

Further, a first holding plate 278 is disposed on the first pad 272 and comprises at least one first projection 280 (shown in FIG. 6). The first holding plate 278 may have a substantially planar configuration. In the illustrated example, the first holding plate 278 includes a pair of first projections 280 corresponding to the pair of first apertures 276. The first projections 280 are aligned with the corresponding first apertures 276. Each of the first projections 280 is a dimple that extends from a surface of the first holding plate 278 facing the first pad 272. The first projections 280 may be integrally formed with the first holding plate 278. Alternatively, the first projections 280 may be attached to the first holding plate 278 by various methods, such as welding, adhesives, and so forth. The first holding plate 278 may have a surface area that is smaller than the surface area of the first pad 272.

As shown in FIG. 6, in an assembled condition of the valve assembly 104, the first pad 272 is disposed and held between the second portion 270 (see FIG. 5) of the valve plate 206 and the first holding plate 278. During assembly, the first holding plate 278 is positioned over the first pad 272 such that each of the first projections 280 extends through the corresponding first aperture 276 (see FIG. 5) of the first pad 272 and contacts the first surface 274 (see FIG. 5) of the valve plate 206. Further, the first projections 280 are welded to the valve plate 206 such that the first pad 272 is secured between the first holding plate 278 and the valve plate 206. In an example, resistance welding is used to weld the first holding plate 278 with the valve plate 206.

As shown in FIG. 5, a second pad 282 is disposed on a second surface 284 of the valve plate 206, the second surface 284 being opposite to the first surface 274 of the valve plate 206. When the valve plate 206 is in the second position, the second pad 282 is sealingly engaged with the baffle 120 along a periphery of an opening 122 of the baffle 120 to prevent fluid flow through the second fluid passageway. The second pad 282 may be made of a wire-mesh material or any other suitable material that reduces noise as the second pad 282 is sealingly engaged with the baffle 120 along the periphery of the opening 122. The second pad 282 may have a surface area that is smaller than the surface area of the second portion 270. The second pad 282 defines at least one second aperture 286. In the illustrated example, the second pad 282 defines a pair of second apertures 286. The second pad 282 may have a substantially planar configuration.

Further, a second holding plate 288 is disposed on the second pad 282 and includes at least one second projection 290. The second holding plate 288 may have a substantially planar configuration. In the illustrated example, the second holding plate 288 includes a pair of second projections 290 corresponding to the pair of second apertures 286. The second projections 290 are aligned with the corresponding second apertures 286. Each of the second projections 290 is a dimple that extends from a surface of the second holding plate 288 facing the second pad 282. The second projections 290 may be integrally formed with the second holding plate 288. Alternatively, the second projections 290 may be attached to the second holding plate 288 by various methods, such as welding, adhesives, and so forth. The second holding plate 288 may have a surface area that is smaller than the surface area of the second pad 282.

Referring to FIG. 6, in an assembled condition of the valve assembly 104, the second pad 282 is disposed and held between the second portion 270 (see FIG. 5) of the valve plate 206 and the second holding plate 288. During assembly, the second holding plate 288 is positioned over the second pad 282 such that each of the second projections 290 extends through the corresponding second aperture 286 of the second pad 282 and contacts the second surface 284 of the valve plate 206. Further, the second projections 290 are welded to the valve plate 206 such that the second pad 282 is secured between the second holding plate 288 and the valve plate 206. In an example, resistance welding is used to weld the second holding plate 288 with the valve plate 206.

In other embodiments, the first and second projections 280, 290 may be provided on the valve plate 206 as opposed to the first and second holding plates 278, 288 to secure the first and second pads 272, 282 between the valve plate 206 and the respective holding plates 278, 288. In some examples, the first holding plate 278 and the second holding plate 288 may be connected to the valve plate 206 during a single resistance welding operation. The profile of the first and second holding plates 278, 288 creates edge to edge contact that can be directly welded to the valve plate 206 without any need for separate fasteners, such as rivets, for holding the valve plate 206 and the first and second pads 272, 282 together. Thus, cost associated with rivets may be eliminated.

In some configurations, the first pad 272 may be attached to the valve seat 208 (see FIG. 5) as opposed to the valve plate 206 and/or the second pad 282 may be attached to the baffle 120 (see FIG. 2) as opposed to the valve plate 206. In such configurations, the valve plate 206 may be sealingly engaged with the second pad 282 when in the second position and may be sealingly engaged with the first pad 272 when in the first position.

Referring to FIG. 4, for assembling the valve assembly 104, the valve shaft 204, the bushings 248, 250, the washers 244, 246, and the sleeves 252, 254 are assembled as a valve shaft sub-assembly. Subsequently, the valve shaft sub-assembly is inserted axially into the through apertures 234, 236 to form the valve assembly 104. After insertion of the valve axis subassembly, the outer surface 256 of the corresponding sleeves 252, 254 and the corresponding inner sides 258 of the stamped valve body 202 around the through apertures 234, 236 provide the welding surfaces "W1" (shown in FIG. 5) to keep the valve axis subassembly in position. Thus, the corresponding sleeves 252, 254 may be welded to the stamped valve body 202 at the welding surfaces "W1".

The valve body 202 embodied as a stamped and deep drawn component is designed in a way that provides sealing surfaces. The sealing surfaces so formed may be circumferentially disposed against the housing assembly 102 (see FIGS. 1 and 2). Further, the stamped component may be used in other applications that includes a valve body which defines sealing surfaces for a moving assembly that may be disposed within such a stamped component at a lower cost and weight. The valve body 202 may provide efficient sealing of the valve assembly 104 against the housing assembly 102 without increasing complexity in a geometry of the valve body 202. Further, the valve body 202 may be manufactured at lower costs as compared to conventional valve bodies and may also be comparatively lighter in weight since the valve body 202 is embodied as a stamped/deep drawn component as compared to conventional valve bodies that are typically cast components. Further, each of the side flanges 224, 226, the bottom flange 222, the walls 228, 230, and the curved portion 232 that circumscribe the entire valve body 202 may provide stiffness and reduce twist as well as tolerance variation.

As shown in FIG. 2, the cup-shaped baffle 120 may extend from the inner surface of the first shell 114 into the first fluid passageway 112 and define the opening 122 that is in fluid communication with the heat exchanger inlet 134. The baffle 120 may be coupled (e.g., welded) with the inner surface of the first shell 114. When the valve plate 206 is in the second position, the second pad 282 may be sealingly engaged with the baffle 120 along the periphery of the opening 122 to prevent fluid flow through the second fluid passageway. In some configurations, the baffle 120 may include flanges (not shown) that may be coupled (e.g., welded) with the inner surface of the first shell 114. In this way, when the valve plate 206 is in the second position, fluid in the baffle 120 may not be able to leak through any gaps between the baffle 120 and the first shell 114.

Referring to FIG. 1, the actuator assembly 124 allows rotation of the valve plate 206 between the first and second positions. The actuator assembly 124 may be mechanically or electrically controlled. The actuator assembly 124 includes a first plate 126, a second plate 128, a bracket 130 (shown in FIGS. 2 and 3), a coiled spring (not shown), and an actuator 132. The bracket 130 and the spring may provide a torturous path from the valve shaft 204 (see FIG. 4) to the actuator 132, which reduces heat conducted from the valve shaft 204 to the actuator 132. The spring may also reduce any vibration transferred to the actuator 132 from the valve plate 206 (see FIG. 2) as the valve plate 206 contacts the baffle 120 (see FIG. 2) and the valve body 202 (see FIG. 2).

The actuator 132 rotates the valve shaft 204 (via the spring and the bracket 130), which, in turn, rotates the valve plate 206 between the first and second positions. A control module (not shown) may communicate with the actuator 132 to rotate the valve shaft 204 and the valve plate 206 between the first and second positions based at least partially on a temperature of the engine or working fluid flowing through the heat exchanger assembly 106, for example. It should be understood that each of the sleeves 252, 254 (see FIG. 4) is adapted to cooperate with the actuator assembly 124 and allow the actuator assembly 124 to be positioned on any one side of the valve seat 208 and the housing assembly 102 without changes to the housing assembly 102, the valve assembly 104, or the heat exchanger assembly 106.

Figure 7:
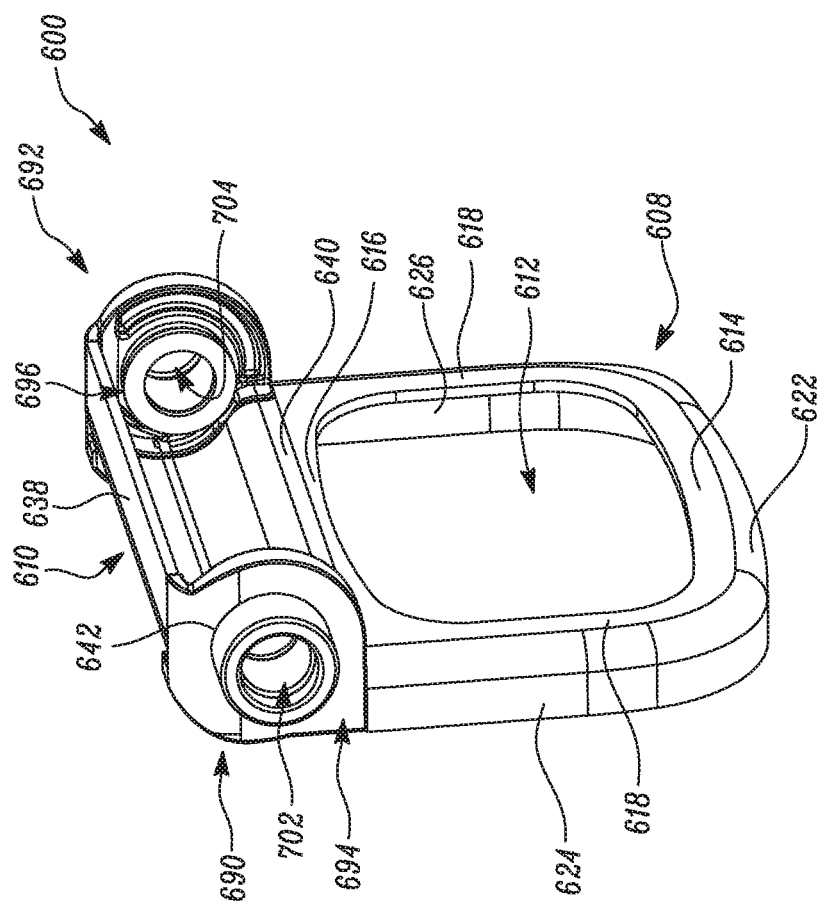
FIG. 7 is a front perspective view of another design of a valve body associated with a valve assembly, according to an aspect of the present disclosure.
Figure 8:
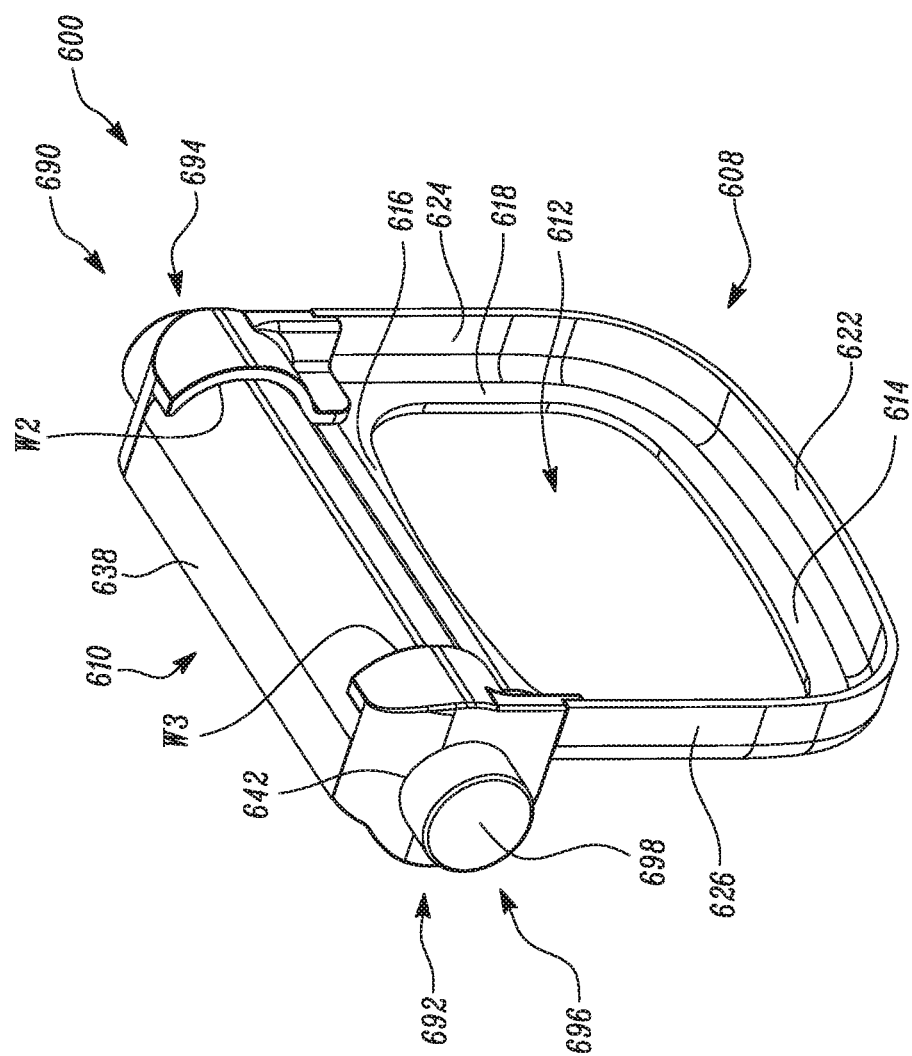
FIG. 8 is a rear perspective view of the valve body of FIG. 7.
Figure 9:
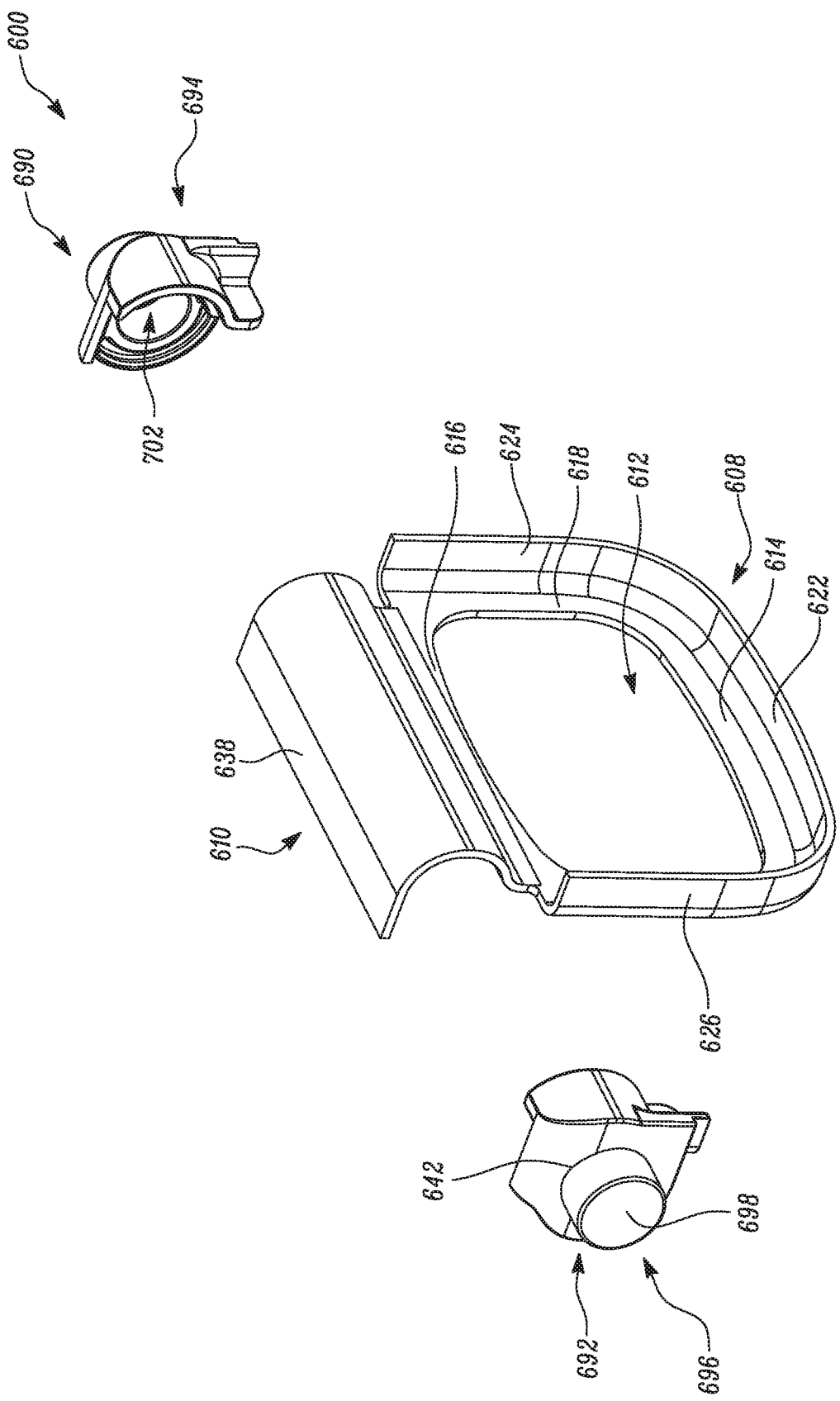
FIG. 9 is an exploded view of the valve body of FIG. 7.

FIGS. 7, 8, 9, and 10 illustrate another design of a valve body 600 associated with a valve assembly 602. The valve body 600 is positioned in the exhaust passageway 112 (see FIG. 1). Referring to FIGS. 7, 8, and 9, the valve body 600 includes a valve seat 608. The valve seat 608 defines a bore 612 therethrough. The valve seat 608 is substantially rectangular in shape with rounded edges. The valve seat 608 includes a bottom wall 614, a top wall 616, and a pair of side walls 618 that define the bore 612. The rectangular-shaped bore 612 may increase a flow rate of fluid flowing through the first fluid passageway 112 (see FIG. 1) compared to a circular opening, for example. Further, the valve seat 608 includes a bottom flange 622 extending from the bottom wall 614, a first side flange 624 extending from the side wall 618, and a second side flange 626 extending from the side wall 618. Each of the bottom, first side, and second side flanges 622, 624, 626 extend along a same direction. Further, each of the bottom, first side, and second side flanges 622, 624, 626 may extend along a direction that is substantially perpendicular to a plane defined by the bore 612.

In some configurations, the bottom flange 622 and the bottom portion of the second shell 116 (see FIGS. 1 and 2) may be attached (e.g., welded) to each other. The side flanges 624, 626 and the sides of the second shell 116 may be attached (e.g., welded) to each other. In this way, any gaps between the valve seat 608 and the housing assembly 102 (see FIGS. 1 and 2) are removed, which reduces internal leaks (i.e., fluid flowing through gaps between the valve seat 608 and the housing assembly 102 and not through the heat exchanger assembly 106) of the EGHR system 100.

Further, the valve body 600 includes the connecting portion 610. The connecting portion 610 is integral with and extends from the valve seat 608. Further, the top wall 616 and the connecting portion 610 are integrally formed. The connecting portion 610 includes a curved profile. An upper edge 638 of the connecting portion 610 is connected to the first shell 114 whereas a lower edge 640 of the connecting portion 610 is connected to the valve seat 608. The connecting portion 610 may be connected to the first shell 114 (see FIGS. 1 and 2) by welding. In the illustrated example, the connecting portion 610 and the valve seat 608 are embodied as a unitary component manufactured by a stamping or deep drawing process.

Further, the valve body 600 includes a pair of end members 690, 692. In the illustrated example, the end members 690, 692 extend in a direction that is opposite to a direction along which the bottom, first side, and second side flanges 622, 624, 626 of the valve seat 608 extend. The pair of end members 690, 692 are connected to the valve body 600 at opposing sides of the valve body 600. Further, each of the pair of end members 690, 692 include a trunnion 694, 696. More particularly, the valve body 600 includes a first end member 690 defining a first trunnion 694 disposed at one side of the connecting portion 610 and a second end member 692 defining a second trunnion 696 disposed at another side of the connecting portion 610.

Each of the trunnions 694, 696 protrudes through a corresponding opening provided in the exhaust passageway 112 (see FIG. 2). More particularly, the trunnion 694 may protrude or extend laterally through an opening 138 (shown in FIG. 2) defined by the first and second shells 114, 116 (see FIG. 1). The opening 138 is at least partially defined by elongated or possibly semi-circular first recess 140 (shown in FIG. 2) formed in the first shell 114 and corresponding elongated or possibly semi-circular second recess 142 (shown in FIG. 2) formed in the second shell 116. Further, the trunnion 696 may protrude or extend laterally through an opening 144 (shown in FIG. 2) defined by the first and second shells 114, 116. The opening is at least partially defined by elongated or possibly semi-circular first recess 146 (shown in FIG. 2) formed in the first shell 114 and corresponding elongated or possibly semi-circular second recess (not shown) formed in the second shell 116.

As shown in FIGS. 7 and 8, the trunnions 694, 696 may be disposed opposed to each other. The trunnions 694, 696 each define a hole 702, 704 extending at least partially therethrough. The trunnions 694, 696 may be substantially cylindrical components extending from the respective first and second end members 690, 692. Each of the holes 702, 704 may be defined by an as-cast inner wall that is not machined after casting. Further, the trunnion 694, 696 of one of the pair of end members 690, 692 defines a blind hole, and wherein the trunnion 694, 696 of the other end member defines a through hole. More particularly, the trunnion 696 of the second end member 692 defines the blind hole, whereas the trunnion 694 of the first end member 690 defines the through hole. The trunnion 696 includes a plate 698 (shown in FIG. 8) that covers the hole 704 of the trunnion 696 at an outer end thereby defining the blind hole. Further, the hole 702 defined by the trunnion 694 is a through hole. Alternatively, the trunnion 696 of the second end member 692 may define the through hole, whereas the trunnion 694 of the first end member 690 may define the blind hole. In an alternate embodiment, each of the trunnions 694, 696 may include through holes, in case leakage rate of exhaust gases through the bushings 648, 650 does not exceed an acceptable limit.

Each of the end members 690, 692 define a land 642 surrounding the respective trunnions 694, 696. The end members 690, 692 may be attached (e.g., welded) to the first and second shells 114, 116 at the respective lands 642. Further, outside surfaces of the end members 690, 692 may be contoured to correspond to the inner walls of the first shell 114 to restrict exhaust gas from passing between the valve seat 608 and the housing assembly 102 (see FIGS. 1 and 2) and out of the EGHR system 100. Each of the pair of end members 690, 692 is formed by casting. Further, each of the pair of end members 690, 692 is welded to the valve body 600. More particularly, the pair of end members 690, 692 are welded to the connecting portion 610 at respective weld zones "W2", "W3" (see FIG. 8). In an embodiment, the valve body 600 apart from the end members 690, 692 is integrally formed by at least one of stamping and deep drawing.

Thus, the valve body 600 includes the first and second end members 690, 692 made of casting. The first and second end members 690, 692 are embodied as cast components to provide close tolerances for receiving the valve axis subassembly in order to provide tight tolerance control and accuracy. Further, the stamped/deep drawn valve seat 608 provides a sealing surface for a valve plate (not shown) in order to lower overall component cost and weight. Specifically, since a major portion of the valve body 600 is embodied as a stamped/deep drawn component as compared to conventional valve bodies that entirely include cast components, the valve body 600 has relatively low component cost and weight. Further, the first and second end members 690, 692 and the valve seat 608 may be welded together at the first and second end members 690, 692 to provide a rigid structure that may minimize welding deformation. The valve body 600 may provide efficient sealing of the valve assembly 602 against the housing assembly 102 without increasing the complexity in the geometry of the valve body 600.

Figure 10:
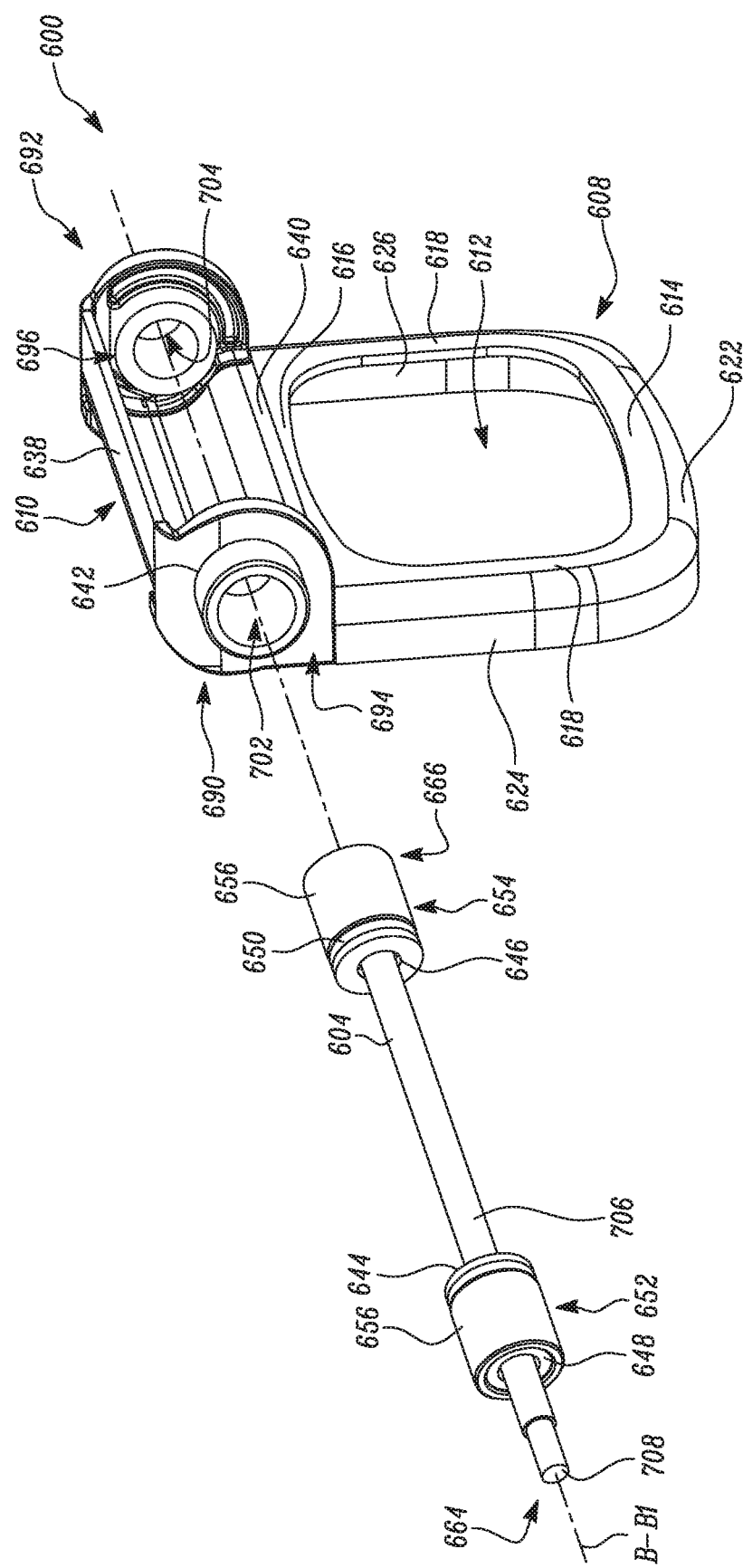
FIG. 10 is an exploded view of the valve assembly including the valve body of FIGS. 7, 8, and 9.

Referring now to FIG. 10, a valve shaft 604 is received in the trunnion 694, 696 of each of the pair of end members 690, 692. In the illustrated example, the valve shaft 604 is rotatably received through the pair of holes 702, 704 of the trunnion 694, 696 such that the valve shaft 604 is rotatable about the end members 690, 692. The valve shaft 604 may extend transversely (i.e., perpendicular relative to the longitudinal direction of the housing assembly 102) with respect to the first fluid passageway 112 (see FIG. 1) and is rotatable about an axis "B-B1". Alternatively, the valve shaft 604 may be fixedly connected to the end members 690, 692. The valve shaft 604 and the pair of holes 702, 704 may be coaxially aligned. The valve shaft 604 includes a central portion 706 and a pair of side portions 708 (one of which is illustrated herein) disposed at either ends 664, 666 of the valve shaft 604. The central portion 706 has a diameter that is greater than a diameter of each of the side portions 708 of the valve shaft 604. Further, the curved connecting portion 610 partially encloses the valve shaft 604, when the valve shaft 604 is coupled with the valve body 600.

The valve assembly 602 includes a pair of washers 644, 646 and a pair of bushings 648, 650. The pair of washers 644, 646 are embodied as rings that may be manufactured by a stamping process. Each of the pair of washers 644, 646 receive the valve shaft 604 therethrough and are disposed adjacent to a corresponding bushing 648, 650 of the pair of bushings 648, 650. More particularly, the first washer 644 of the valve assembly 602 is disposed adjacent to the first bushing 648, whereas the second washer 646 is disposed adjacent to the second bushing 650. The first washer 644 and the first bushing 648 may sealingly engage with a wall of the end member 690 whereas the second washer 646 and the second bushing 650 may sealingly engage with a wall of the end member 692.

In an assembled condition of the valve assembly 602, the first and second washers 644, 646 are held in position by the central portion 706 of the valve shaft 604. More particularly, the first washer 644 is disposed between the central portion 706 of the valve shaft 604 and the first bushing 648 proximal to the end 664 of the valve shaft 604 to prevent the first bushing 648 and the first washer 644 from moving axially along the valve shaft 604. Further, the second washer 646 is disposed between the central portion 706 of the valve shaft 604 and the second bushing 650 proximal to the end 666 of the valve shaft 604 to prevent the second bushing 650 and the second washer 646 from moving axially along the valve shaft 604. In an alternate embodiment, when the valve assembly 602 is in the assembled condition, the first and second washers 644, 646 may be held in position by a valve plate to prevent the respective bushings 648, 650 from moving axially along the valve shaft 604. The washers 644, 646 may also reduce external leaks (i.e., fluid flowing out of the EGHR system 100) of the EGHR system 100.

The valve assembly 602 includes a pair of sleeves 652, 654 connected to the end members 690, 692 of the valve body 600. Each of the pair of sleeves 652, 654 may be made of tube steel. Each of the pair of sleeves 652, 654 is at least partially received within the trunnion 694, 696 of the corresponding end member 690, 692 of the pair of end members 690, 692. Specifically, the sleeve 652 is at least partially received within the trunnion 694, while the sleeve 654 is at least partially received within the trunnion 696. Each of the sleeves 652, 654 may have a substantially hollow cylindrical shape. Further, each of the first and second sleeves 652, 654 define a through-opening (not shown), respectively.

The first and second bushings 648, 650 may be embodied as wire-mesh bushings that may be disposed to rotatably support the valve shaft 604. Each of the pair of bushings 648, 650 is received at least partially within the corresponding sleeve 652, 654 of the pair of sleeves 652, 654. More particularly, the pair of bushings 648, 650 are partially received within the through-openings of the corresponding sleeve 652, 654 of the pair of sleeves 652, 654. Further, the valve shaft 604 is at least partially received within the pair of bushings 648, 650. Each of the bushings 648, 650 may include a substantially hollow cylindrical shape with a flange at one end. The flange may interface with the corresponding washer 644 or 646. It should be noted that the valve shaft 604, the washers 644, 646, and the sleeves 652, 654 may be manufactured easily at a lower cost by cutting sections off corresponding elongate profiles.

On insertion of the valve shaft 604, an outer surface 656 of the respective sleeve 652, 654 and an inner side (not shown) of the end members 690, 692 may define welding surfaces (not shown) to keep the valve shaft 604, the bushings 648, 650, and the washers 644, 646 in position. Thus, the sleeves 652, 654 may be connected to the inner side of the corresponding end members 690, 692 by welding thereby eliminating any undesirable movement of the valve shaft 604, the bushings 648, 650, and the washers 644, 646. Alternatively, the sleeves 652, 654 may be press-fitted to the valve body 600.

Further, the valve plate is connected to the valve shaft 604. The valve plate is similar to the valve plate 206 described in reference to FIGS. 2, 4, 5, and 6. The valve plate is rotatable between a first position and a second position. The valve plate is adjacent to the valve seat 608 when the valve assembly 602 is in the first position. The valve plate is adjacent to the second valve seat 120 (see FIG. 2) when the valve assembly 602 is in the second position. More particularly, the valve plate is disposed adjacent to the baffle 120 when the valve assembly 602 is in the second position. A function and the positions of the valve plate is similar to the function and positions of the valve plate 206. Further, the valve assembly also includes other components (not shown) such as a first pad, a first holding plate, a second pad, and a second holding plate similar to the first pad 272, the first holding plate 278, the second pad 282, and the second holding plate 288 of the valve assembly 104, respectively.

For assembling the valve assembly 602, the first and second end members 690, 692 are disposed on opposing sides of the valve seat 608. Further, the valve shaft 604, the bushings 648, 650, the washers 644, 646, and the sleeves 652, 654 are assembled as a valve shaft sub-assembly. Subsequently, the valve shaft sub-assembly is inserted axially into the holes 702, 704 such that the valve shaft subassembly is partially received within the hole 704 to form the valve assembly 602. After insertion of the valve axis subassembly, the first and second end members 690, 692 and the valve seat 608 are welded together. Further, the outer surface 656 of the corresponding sleeves 652, 654 and the corresponding inner sides of the valve body 600 may provide the welding surfaces to keep the valve axis subassembly in position. Thus, the sleeves 652, 654 may be welded to the valve body 600 at the corresponding welding surfaces.

Figure 11:
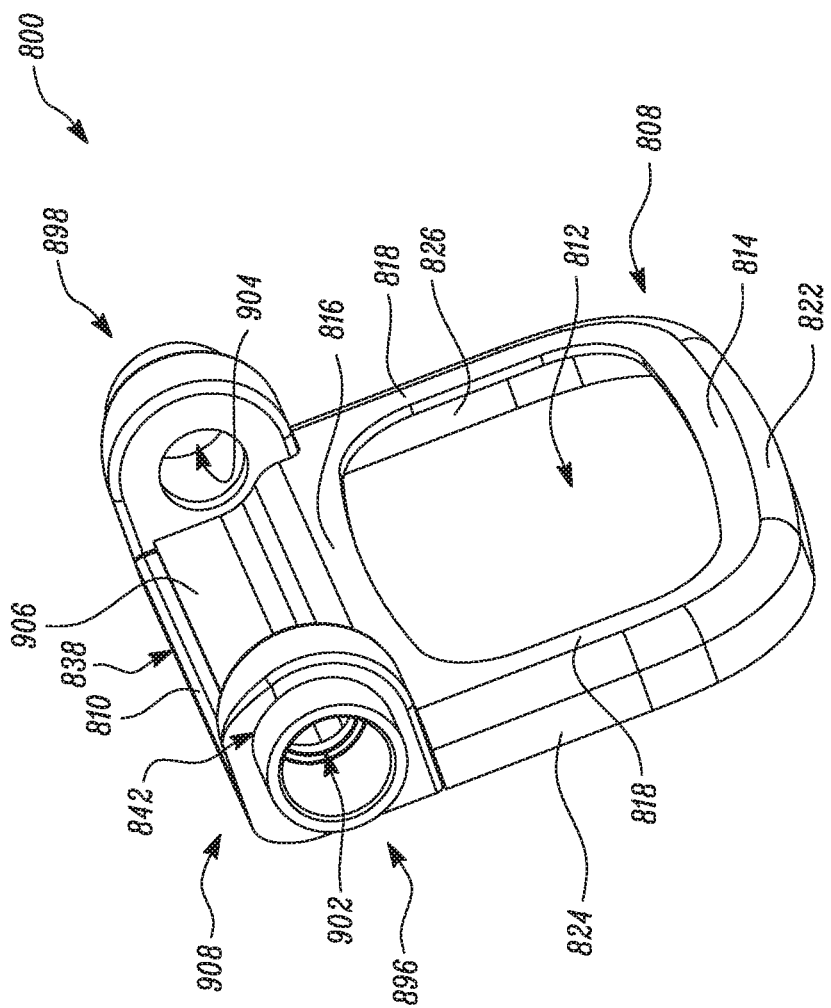
FIG. 11 is a front perspective view of yet another design of a valve body associated with a valve assembly, according to an aspect of the present disclosure.
Figure 12:
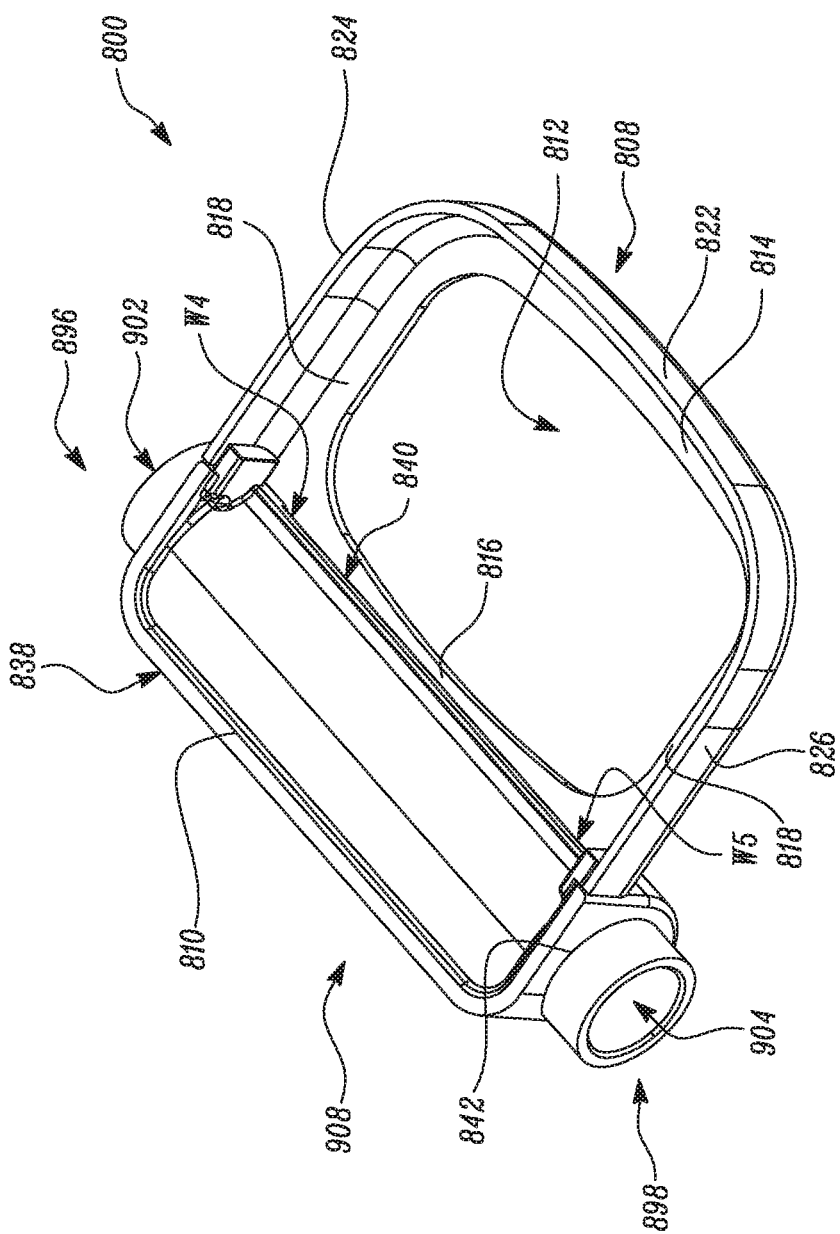
FIG. 12 is a rear perspective view of the valve body of FIG. 11.
Figure 13:
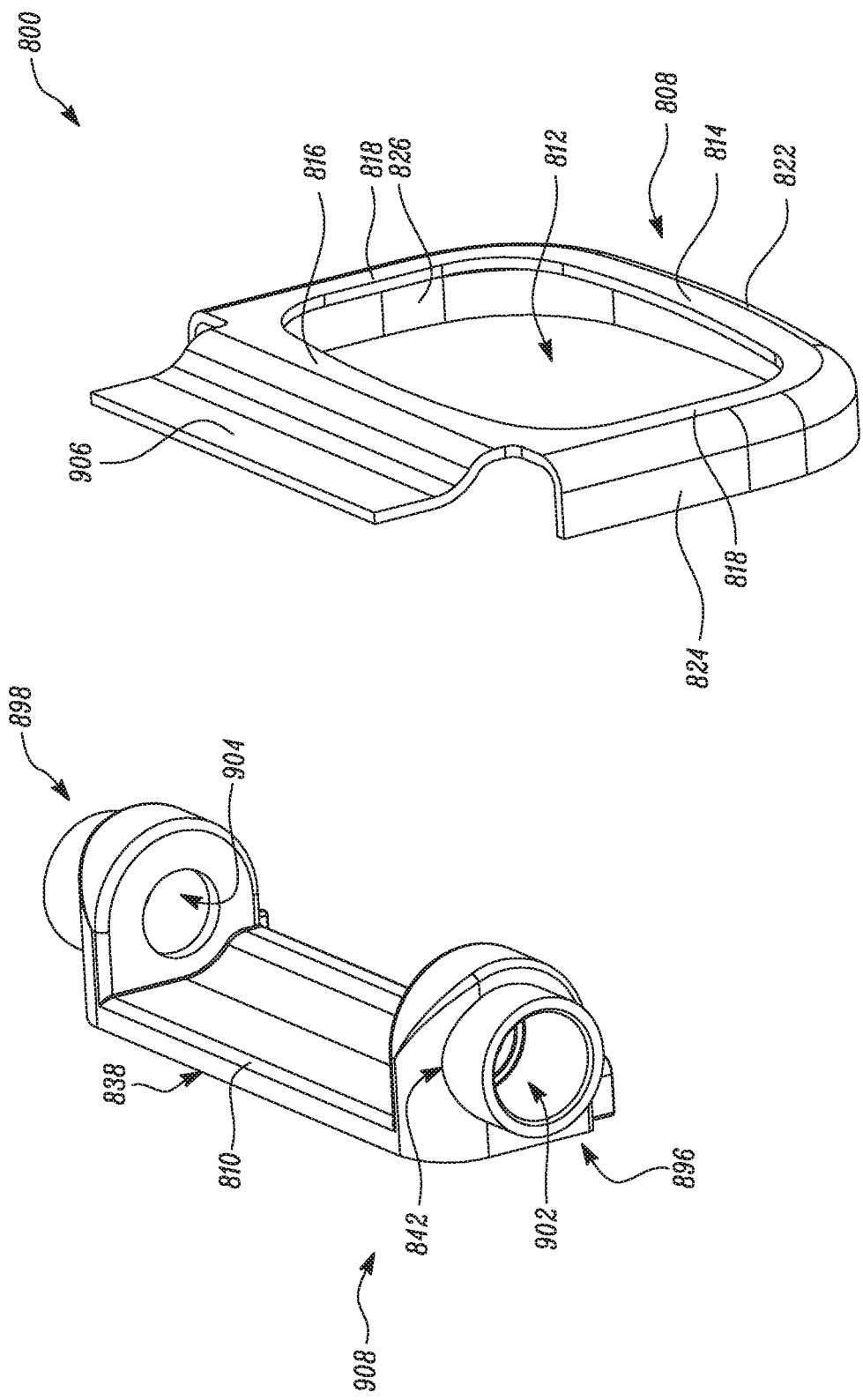
FIG. 13 is an exploded view of the valve body of FIG. 11.

FIGS. 10, 11, 12, 13, and 14 illustrate yet another design of a valve body 800 associated with a valve assembly 802. The valve body 800 is positioned in the exhaust passageway 112 (see FIG. 1). Referring to FIGS. 10, 11, and 12, the valve body 800 includes a valve seat 808. The valve seat 808 defines a bore 812 therethrough. The valve seat 808 is substantially rectangular in shape with rounded edges. The valve seat 808 includes a bottom wall 814, a top wall 816, and a pair of side walls 818 that define the bore 812. The rectangular-shaped bore 812 may increase a flow rate of fluid flowing through the first fluid passageway 112 (see FIG. 1) compared to a circular opening, for example. Further, the valve seat 808 includes a bottom flange 822 extending from the bottom wall 814, a first side flange 824 extending from the side wall 818, and a second side flange 826 extending from the side wall 818. Each of the bottom, first side, and second side flanges 822, 824, 826 extend along a same direction. Further, each of the bottom, first side, and second side flanges 822, 824, 826 may extend along a direction that is substantially perpendicular to a plane defined by the bore 812.

In some configurations, the bottom flange 822 and the bottom portion of the second shell 116 (see FIGS. 1 and 2) may be attached (e.g., welded) to each other. The side flanges 824, 826 and the sides of the second shell 116 may be attached (e.g., welded) to each other. In this way, any gaps between the valve seat 808 and the housing assembly 102 (see FIGS. 1 and 2) are removed, which reduces internal leaks (i.e., fluid flowing through gaps between the valve seat 808 and the housing assembly 102 and not through the heat exchanger assembly 106) of the EGHR system 100. Further, the valve seat 808 includes a rectangular top flange 906 (shown in FIG. 9) extending from a top wall 816 of the valve seat 808. In an assembled condition of the valve assembly 104, the flange 906 is disposed adjacent to a connecting portion 810. In some examples, the flange 906 may be welded to the connecting portion 810.

The valve body 800 includes a bearing member 908 connected to the valve body 800. The bearing member 908 includes a pair of trunnions 896, 898 at opposing sides of the bearing member 908. In the illustrated example, the pair of trunnions 896, 898 extend in a direction that is opposite to the direction along which the bottom, first side, and second side flanges 822, 824, 826 of the valve seat 808 extend.

The trunnions 896, 898 may be disposed opposite to each other. Each of the trunnions 896, 898 define an aperture 902, 904 extending at least partially therethrough. Specifically, the trunnion 896 defines the aperture 902 and the trunnion 898 defines the aperture 904. The aperture 902, 904 may be defined by an as-cast inner wall that is not machined after casting. In the illustrated embodiment, each of the apertures 902, 904 is a through aperture. In another embodiment, one of the trunnions 896, 898 may define a blind hole, and one of the trunnions 896, 898 may define a through hole. Alternatively, one of the apertures 902, 904 may be sealingly engaged with a cap such that fluid flowing through the first fluid passageway 112 does not leak out of the EGHR system 100. In some configurations, the cap may be disposed outside of one of the apertures 902, 904 to cover one of the apertures 902, 904. In an alternate embodiment, each of the trunnions 896, 898 may include through holes, in case leakage rate of exhaust gases through the bushings 848, 850 does not exceed an acceptable limit.

Each of the trunnions 896, 898 protrudes through a corresponding opening provided in the exhaust passageway 112 (see FIG. 2). More particularly, the trunnion 896 may protrude or extend laterally through the opening 138 (shown in FIG. 2) defined by the first and second shells 114, 116 (see FIG. 1). Further, the trunnion 898 may protrude or extend laterally through the opening 144 (shown in FIG. 2) defined by the first and second shells 114, 116.

Further, the bearing member 908 includes the connecting portion 810 extending between the pair of trunnions 896, 898. The connecting portion 810 includes a curved profile. In the assembled condition, the flange 906 is disposed adjacent to the curved profile of the connecting portion 810. An upper edge 838 of the connecting portion 810 is connected to the first shell 114, whereas a lower edge 840 of the connecting portion 810 is connected to the valve seat 808. The connecting portion 810 may be connected to the first shell 114 by welding.

Each of the trunnions 896, 898 define a land 842 surrounding the respective trunnion 896, 898. The first and second shells 114, 116 are welded to the bearing member 908 at each land 842. The trunnions 896, 898 may be attached (e.g., welded) to the first and second shells 114, 116 at the respective lands 842. Further, outside surfaces of the trunnions 896, 898 may be contoured to correspond to the inner walls of the first shell 114 to restrict exhaust gas from passing between the valve seat 808 and the housing assembly 102 (see FIGS. 1 and 2) and out of the EGHR system 100. The bearing member 908 is formed by casting. Further, the bearing member 908 is welded to the valve body 800. More particularly, the bearing member 908 is welded to the valve seat 808 at weld zones "W4", "W5" (see FIG. 10). In an embodiment, the valve body 800 apart from the bearing member 908 is integrally formed by at least one of stamping and deep drawing.

The bearing member 908 of the valve body 800 may be a cast component as the bearing member 908 requires close tolerances for receiving the valve axis sub-assembly in order to provide tight tolerance control and accuracy. Further, the stamped/deep drawn valve seat 808 may provide a sealing surface for the valve plate 808 in order to lower component cost and weight. Specifically, since a major portion of the valve body 700 is embodied as a stamped/deep drawn component as compared to conventional valve bodies that entirely include cast components, the valve body 700 has relatively low component cost and weight. Further, the bearing member 908 and the valve seat 808 may be welded together at the bearing member 908 to provide a rigid structure that minimizes welding deformation. The valve body 800 may provide efficient sealing of the valve assembly 802 against the housing assembly 102 without increasing the complexity in the geometry of the valve body 800.

Figure 14:
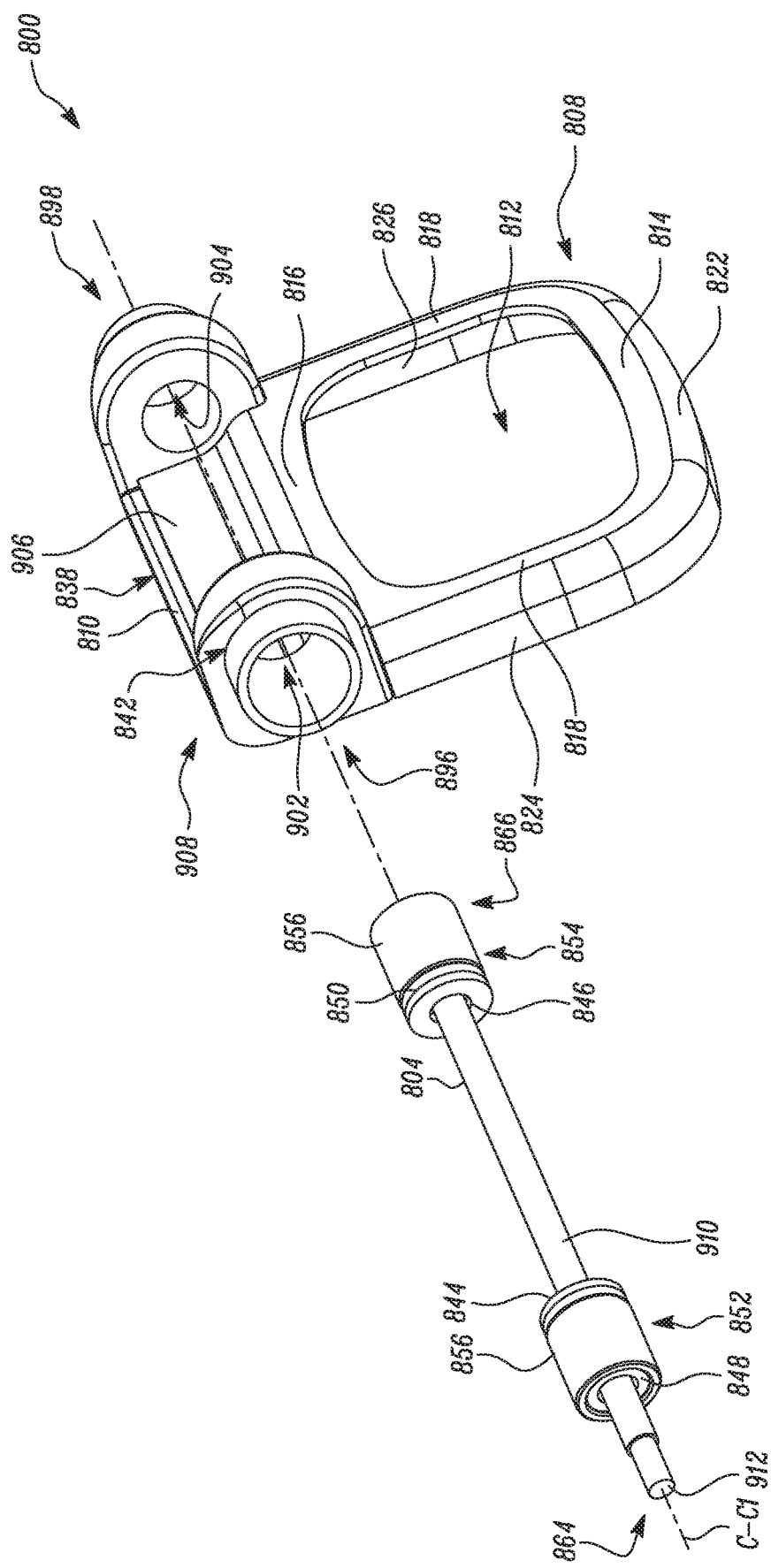
FIG. 14 is an exploded view of the valve assembly including the valve body of FIGS. 11, 12, and 13.

Referring now to FIG. 14, the valve shaft 804 is received in the pair of trunnions 896, 898. In the illustrated example, the valve shaft 804 is rotatably received through the pair of trunnions 896, 898 such that the valve shaft 804 is rotatable about the bearing member 908. More particularly, the valve shaft 804 is received within the pair of through apertures 902, 904 of the corresponding trunnions 896, 898. The valve shaft 804 may extend transversely (i.e., perpendicular relative to the longitudinal direction of the housing assembly 102) with respect to the first fluid passageway 112 (see FIG. 1) and is rotatable about the axis "C-C1". Alternatively, the valve shaft 804 may be fixedly connected to the bearing member 908. The valve shaft 804 and the pair of through apertures 902, 904 may be coaxially aligned. The valve shaft 804 includes a central portion 910 and a pair of side portions 912 (one of which is illustrated herein) disposed at either ends 864, 866 of the valve shaft 804. The central portion 910 has a diameter that is greater than a diameter of each of the side portions 912 of the valve shaft 804. Further, the top flange 906 partially encloses the valve shaft 804, when the valve shaft 804 is coupled with the valve body 800.

The valve assembly 802 includes a pair of washers 844, 846 and a pair of bushings 848, 850. The pair of washers 844, 846 are embodied as rings that may be manufactured by a stamping process. Each of the pair of washers 844, 846 receive the valve shaft 804 therethrough and are disposed adjacent to a corresponding bushing 848, 850 of the pair of bushings 848, 850. More particularly, the first washer 844 of the valve assembly 802 is disposed adjacent to the first bushing 848, whereas the second washer 846 is disposed adjacent to the second bushing 850. The first washer 844 and the first bushing 848 may sealingly engage with a wall of the first trunnion 896 whereas the second washer 846 and the second bushing 850 may sealingly engage with a wall of the second trunnion 898.

In an assembled condition of the valve assembly 802, the first and second washers 844, 846 are held in position by the central portion 910 of the valve shaft 804. More particularly, the first washer 844 is disposed between the central portion 910 of the valve shaft 804 and the first bushing 648 proximal to the end 864 of the valve shaft 804 to prevent the first bushing 848 and the first washer 844 from moving axially along the valve shaft 804. Further, the second washer 846 is disposed between the central portion 910 of the valve shaft 804 and the second bushing 850 proximal to the end 866 of the valve shaft 804 to prevent the second bushing 850 and the second washer 846 from moving axially along the valve shaft 804. In an alternate embodiment, when the valve assembly 802 is in the assembled condition, the first and second washers 844, 846 may be held in position by a valve plate to prevent the respective bushings 848, 850 from moving axially along the valve shaft 804. The washers 844, 846 may also reduce external leaks (i.e., fluid flowing out of the EGHR system 100) of the EGHR system 100.

The valve assembly 802 includes a pair of sleeves 852, 854 connected to the trunnions 896, 898, respectively, of the valve body 800. Each of the pair of sleeves 852, 854 may be made of tube steel. Each of the pair of sleeves 852, 854 is at least partially received within the corresponding trunnion 896, 898 of the pair of trunnions 896, 898 of the bearing member 908. Specifically, the sleeve 852 is at least partially received within the trunnion 896, while the sleeve 854 is at least partially received within the trunnion 898. Each of the sleeves 852, 854 may have a substantially hollow cylindrical shape. Each of the first and second sleeves 852, 854 define a through-opening, respectively.

Further, the first and second bushings 848, 850 may be embodied as wire-mesh bushings that may be disposed to rotatably support the valve shaft 804. Each of the pair of bushings 848, 850 is received at least partially within the corresponding sleeve 852, 854 of the pair of sleeves 852, 854. More particularly, the pair of bushings 848, 850 are partially received within the through-openings of the corresponding sleeve 852, 854 of the pair of sleeves 852, 854. Further, the valve shaft 804 is at least partially received within the pair of bushings 848, 850. Each of the bushings 848, 850 may include a substantially hollow cylindrical shape with a flange at one end. The flange may interface with the corresponding washer 844 or 846. It should be noted that the valve shaft 804, the washers 844, 846, and the sleeves 852, 854 may be manufactured easily at a lower cost by cutting sections off corresponding elongate profiles.

On insertion of the valve shaft 804, an outer surface 856 of the respective sleeve 852, 854 and an inner side (not shown) of the bearing member 908 around the through-apertures 902, 904 may define welding surfaces (not shown) to keep the valve shaft 804, the bushings 848, 850, and the washers 844, 846 in position. Thus, the sleeves 852, 854 may be connected to the inner side of the bearing member 908 by welding thereby eliminating any undesirable movement of the valve shaft 804, the bushings 848, 850, and the washers 844, 846. Alternatively, the sleeves 852, 854 may be press-fitted to the valve body 800.

Further, the valve plate is connected to the valve shaft 804. The valve plate is similar to the valve plate 206 described in reference to FIGS. 2, 4, 5, and 6. The valve plate is rotatable between a first position and a second position. The valve plate is adjacent to the valve seat 808 when the valve assembly 802 is in the first position. Further, the valve plate is adjacent to the second valve seat 120 (see FIG. 2) when the valve assembly 802 is in the second position. More particularly, the valve plate is disposed adjacent to the baffle 120 when the valve assembly 802 is in the second position. A function and the positions of the valve plate is similar to the function and the positions of the valve plate 206. Further, the valve assembly 802 also includes other components (no shown) such as a first pad, a first holding plate, a second pad, and a second holding plate similar to the first pad 272, the first holding plate 278, the second pad 282, and the second holding plate 288 of the valve assembly 104, respectively.

For assembling the valve assembly 802, the bearing member 908 is disposed with respect to the valve seat 808. Further, the valve shaft 804, the bushings 848, 850, the washers 844, 846, and the sleeves 852, 854 are assembled as a valve shaft sub-assembly. Subsequently, the valve shaft sub-assembly is inserted axially into the trunnions 896, 898 to form the valve assembly 802. After insertion of the valve axis subassembly, the bearing member 908 and the valve seat 808 are welded together. Further, the outer surface 856 of the corresponding sleeves 852, 854 and the corresponding inner sides of the valve body 800 may provide the welding surfaces to keep the valve axis subassembly in position. Thus, the corresponding sleeves 852, 854 may be welded to the valve body 800 at the welding surfaces.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof

What is claimed is:

1. A valve assembly for positioning in a housing assembly defining an exhaust passageway comprising:
    a valve body comprising a valve seat comprising a bottom wall, a top wall, and first and second side walls, the valve seat defining a bore extending therethrough, the valve seat further comprising at least one flange extending from one of the bottom wall, first side wall and second side wall along a direction that is substantially perpendicular to a plane defined by the bore;
    the valve body further comprising a solid connecting portion having first and second ends, the first end of the connecting portion extending from the top wall of the valve seat and the second end configured to connect to the housing assembly;
    a pair of end members extending in a direction perpendicular to a direction along which the at least one flange extends and is configured to be connected to the connecting portion at opposing sides of the valve body and forming part of the first and second side walls, an outer side wall surface of each of the pair of end members being contoured to correspond to an inner wall of the connecting portion, each of the pair of end members further comprising a trunnion, wherein each of the trunnions protrudes through a corresponding opening provided in the exhaust passageway;
    a valve shaft received in the trunnion of each of the pair of end members; the valve shaft comprising a pair of ends with each end received in a through hole in each trunnion of the pair of end members;
    an end plate covering the through hole of each trunnion of the pair of end members and sealing each end of the pair of ends of the valve shaft in the pair of end members; and
    a valve plate connected to the valve shaft, the valve plate being rotatable between a first position and a second position, wherein the valve plate is adjacent to the valve seat when the valve assembly is in the first position.

2. The valve assembly of claim 1, wherein the trunnion of one of the pair of end members defines a blind hole, and wherein the trunnion of the other end member defines a through hole.

3. The valve assembly of claim 1, further comprising:
    a first pad disposed on a first surface of the valve plate, the first pad defining at least one first aperture; and
    a first holding plate disposed on the first pad and comprising at least one first projection, the at least one first projection extending through the at least one first aperture of the first pad and contacting the first surface of the valve plate, wherein the at least one first projection is welded to the valve plate such that the first pad is secured between the first holding plate and the valve plate.

4. The valve assembly of claim 3, further comprising:
    a second pad disposed on a second surface of the valve plate, the second surface being opposite to the first surface of the valve plate, the second pad defining at least one second aperture; and
    a second holding plate disposed on the second pad and comprising at least one second projection, the at least one second projection extending through the at least one second aperture of the second pad and contacting the second surface of the valve plate, wherein the at least one second projection is welded to the valve plate such that the second pad is secured between the second holding plate and the valve plate.

5. The valve assembly of claim 1, further comprising:
a pair of sleeves, each of the pair of sleeves at least partially received within the trunnion of a corresponding end member of the pair of end members; and
a pair of bushings, each of the pair of bushings received at least partially within a corresponding sleeve of the pair of sleeves, wherein the valve shaft is at least partially received within the pair of bushings.

6. The valve assembly of claim 5, further comprising a pair of washers, each of the pair of washers receiving the valve shaft therethrough and disposed adjacent to a corresponding bushing of the pair of bushings.

7. The valve assembly of claim 1, wherein the valve plate is adjacent to another valve seat when the valve assembly is in the second position.

8. The valve assembly of claim 1, wherein the bore is substantially rectangular shaped to increase flow rate of fluid flowing through the exhaust passageway.

9. The valve assembly of claim 1, wherein a bottom flange extends from the bottom wall, a first side flange extends from the first side wall, and a second side flange extends from the second side wall, with each of the bottom flange, first side flange, and second side flange extending along a same direction and along a direction that is substantially perpendicular to a plane defined by the bore.

10. The valve assembly of claim 1, wherein the connecting portion has a curved profile extending between the first and second ends.

11. The valve assembly of claim 10, wherein the outer side wall surface of each of the pair of end members is contoured to correspond to the curved profile of the connecting portion.

12. The valve assembly of claim 1, wherein the plane is aligned with a center of rotation of the rotatable valve plate.

13. A valve assembly for positioning in a housing assembly defining an exhaust passageway comprising:
a valve body comprising a valve seat comprising a bottom wall, a top wall, and first and second side walls, the valve seat defining a bore extending therethrough, the valve seat further comprising at least one flange extending from one of the bottom wall, first side wall and second side wall along a direction that is substantially perpendicular to a plane defined by the bore;
the valve body further comprising a solid body flange having first and second ends, the first end of the body flange extending from the top wall of the valve seat and the second end configured to connect to the housing assembly;
a bearing member comprising a pair of trunnions at opposing sides of the bearing member and a connecting portion therebetween, the body flange extending between the trunnions and connecting to the connecting portion; the trunnions extending in a direction perpendicular to a direction along which the at least one flange extends, the bearing member configured to be connected to the body flange; an outer side wall surface at each end of the bearing member being contoured and forming part of the first and second side walls, wherein each of the trunnions protrudes through a corresponding opening provided in the exhaust passageway;
a valve shaft received in the pair of trunnions; the valve shaft comprising a pair of ends with each end received in a through hole in each trunnion of the pair of end members;
an end plate covering the through hole of each trunnion of the pair of end members and sealing each end of the pair of ends of the valve shaft in the pair of end members; and
a valve plate connected to the valve shaft, the valve plate being rotatable between a first position and a second position, wherein the valve plate is adjacent to the valve seat when the valve assembly is in the first position.

14. The valve assembly of claim 13, further comprising:
a first pad disposed on a first surface of the valve plate, the first pad defining at least one first aperture; and
a first holding plate disposed on the first pad and comprising at least one first projection, the at least one first projection extending through the at least one first aperture of the first pad and contacting the first surface of the valve plate, wherein the at least one first projection is welded to the valve plate such that the first pad is secured between the first holding plate and the valve plate.

15. The valve assembly of claim 14, further comprising:
a second pad disposed on a second surface of the valve plate, the second surface being opposite to the first surface of the valve plate, the second pad defining at least one second aperture; and
a second holding plate disposed on the second pad and comprising at least one second projection, the at least one second projection extending through the at least one second aperture of the second pad and contacting the second surface of the valve plate, wherein the at least one second projection is welded to the valve plate such that the second pad is secured between the second holding plate and the valve plate.

16. The valve assembly of claim 13, further comprising:
a pair of sleeves, each of the pair of sleeves at least partially received within a corresponding trunnion of the pair of trunnions of the bearing member; and
a pair of bushings, each of the pair of bushings received at least partially within a corresponding sleeve of the pair of sleeves, wherein the valve shaft is at least partially received within the pair of bushings.

17. The valve assembly of claim 16, further comprising a pair of washers, each of the pair of washers receiving the valve shaft therethrough and disposed adjacent to a corresponding bushing of the pair of bushings.

18. The valve assembly of claim 13, wherein the valve plate is adjacent to another valve seat when the valve assembly is in the second position.

19. The valve assembly of claim 13, wherein a bottom flange extends from the bottom wall, a first side flange extends from the first side wall, and a second side flange extends from the second side wall, with each of the bottom flange, first side flange, and second side flange extending along a same direction and along a direction that is substantially perpendicular to a plane defined by the bore.

20. The valve assembly of claim 13, wherein the body flange has a flat profile extending between the first and second ends.

21. The valve assembly of claim 20, wherein the outer side wall surface of each of the end members is contoured to correspond to a curved profile of the valve body.

22. The valve assembly of claim 13, wherein the plane is aligned with a center of rotation of the rotatable valve plate.

* * * * *